(12) United States Patent
Takahashi et al.

(10) Patent No.: US 10,888,406 B2
(45) Date of Patent: Jan. 12, 2021

(54) COMPUTER, COMPUTER-IMPLEMENTED METHOD, COMPUTER PROGRAM, AND FACE-BOW

(71) Applicant: MEDICOM LLC, Fukui (JP)

(72) Inventors: Lara Takahashi, Fukui (JP); Atsushi Takahashi, Fukui (JP)

(73) Assignee: MEDICOM LLC, Fukui (JP)

( * ) Notice: Subject to any disclaimer, the term of this patent is extended or adjusted under 35 U.S.C. 154(b) by 798 days.

(21) Appl. No.: 15/328,035

(22) PCT Filed: Jul. 1, 2015

(86) PCT No.: PCT/JP2015/068969
§ 371 (c)(1),
(2) Date: Sep. 19, 2017

(87) PCT Pub. No.: WO2016/013359
PCT Pub. Date: Jan. 28, 2016

(65) Prior Publication Data
US 2018/0049855 A1    Feb. 22, 2018

(30) Foreign Application Priority Data

Jul. 22, 2014 (JP) ................................ 2014-149284

(51) Int. Cl.
| | | |
|---|---|---|
| *A61C 19/045* | (2006.01) | |
| *A61C 19/04* | (2006.01) | |
| *A61C 7/00* | (2006.01) | |
| *A61C 9/00* | (2006.01) | |
| *A61C 11/00* | (2006.01) | |
| *A61C 13/00* | (2006.01) | |

(52) U.S. Cl.
CPC ............ *A61C 19/045* (2013.01); *A61C 7/002* (2013.01); *A61C 9/0053* (2013.01); *A61C 11/00* (2013.01); *A61C 13/0004* (2013.01); *A61C 19/04* (2013.01)

(58) Field of Classification Search
CPC ....... A61C 7/002; A61C 9/0053; A61C 11/00; A61C 13/0004; A61C 19/04
See application file for complete search history.

(56) References Cited

U.S. PATENT DOCUMENTS

| | | | | |
|---|---|---|---|---|
| 8,253,778 | B2 * | 8/2012 | Atsushi .................. | A61C 1/084 348/42 |
| 8,821,158 | B1 * | 9/2014 | Hultgren .............. | A61C 9/0006 433/215 |
| 10,098,714 | B2 * | 10/2018 | Kuo ......................... | A61B 1/24 |
| 2013/0066598 | A1 * | 3/2013 | Fisker .................... | A61C 11/00 703/1 |

* cited by examiner

*Primary Examiner* — Edward Park

(57) ABSTRACT

A diagnosis device provided with a position data generation unit (224) and a linking unit (226). The position data generation unit (224) generates first position data and second position data using a relative position image showing the relative positions of an upper bow and a bite-fork, an upper-part image showing the positional relationship of the bite-fork and the maxillary dental arch of a patient, and an articulation image showing the positional relationship of the maxillary dental arch and the mandibular dental arch of the patient. The linking unit (226) generates a virtual articulator by positioning three-dimensional models of the patient's maxillary dental arch and mandibular dental arch generated by a model generation unit (223), using the first position data and the second position data.

8 Claims, 8 Drawing Sheets

[FIG. 1]
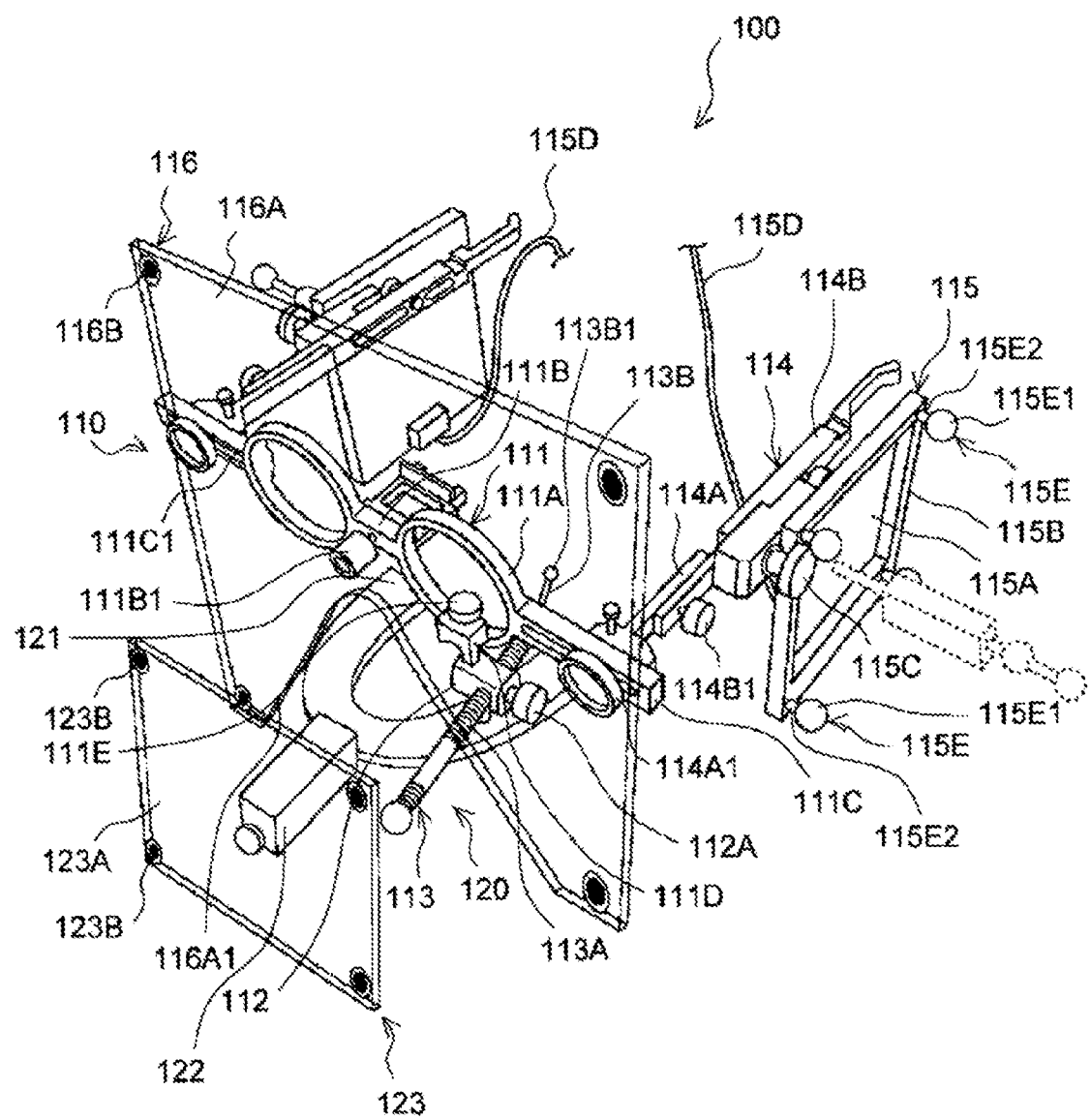

[FIG. 2]
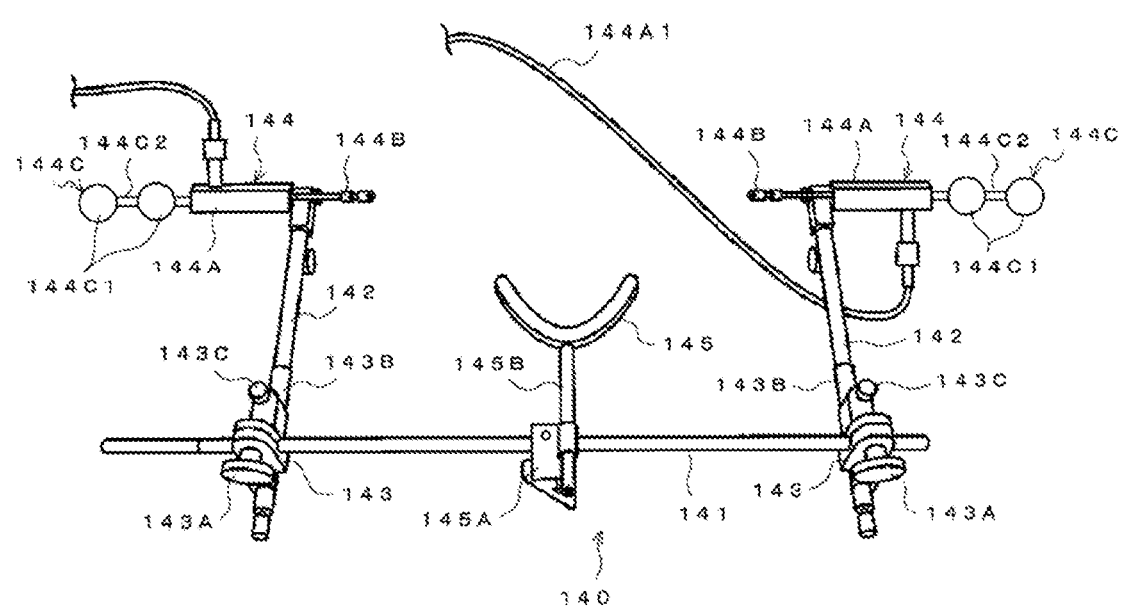

[FIG. 3]
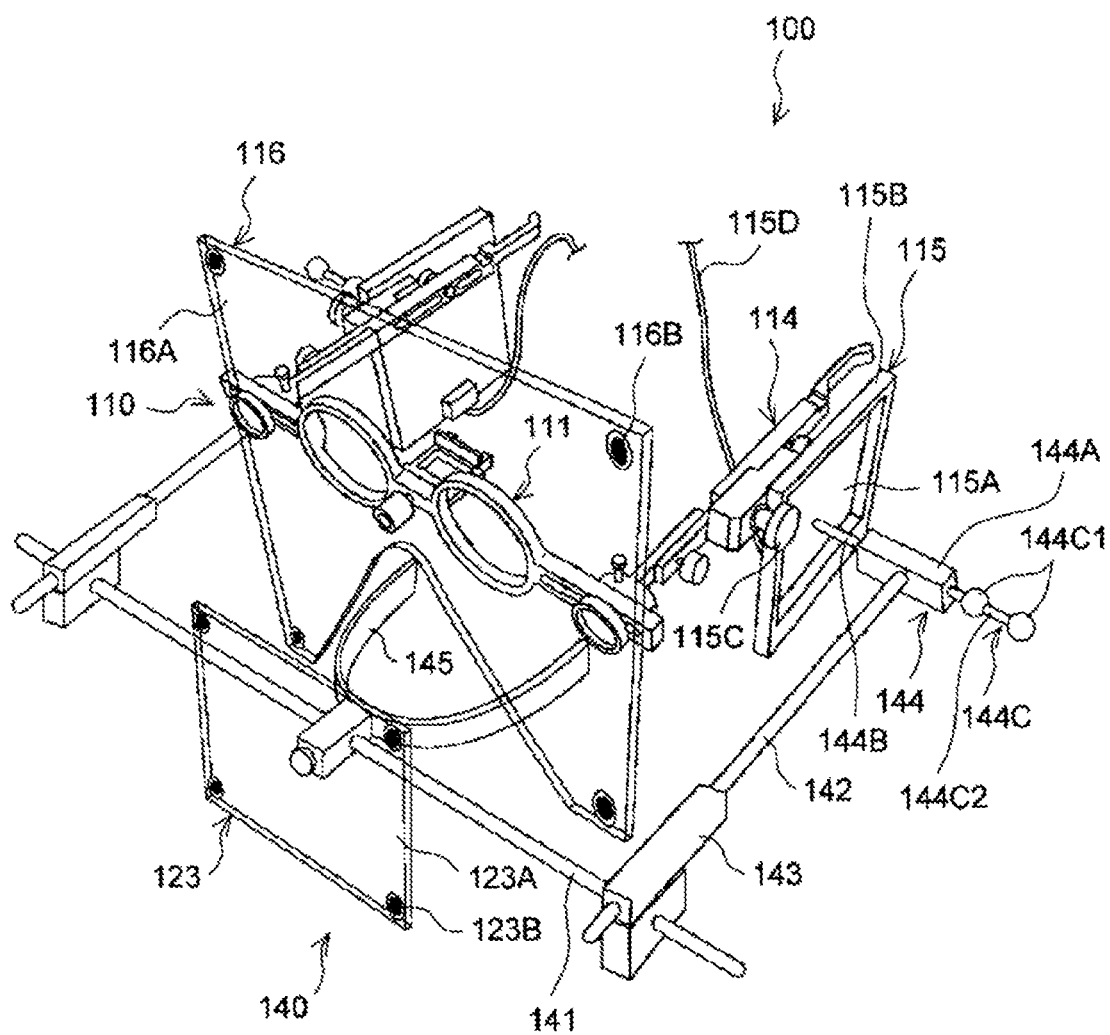

[FIG. 4]
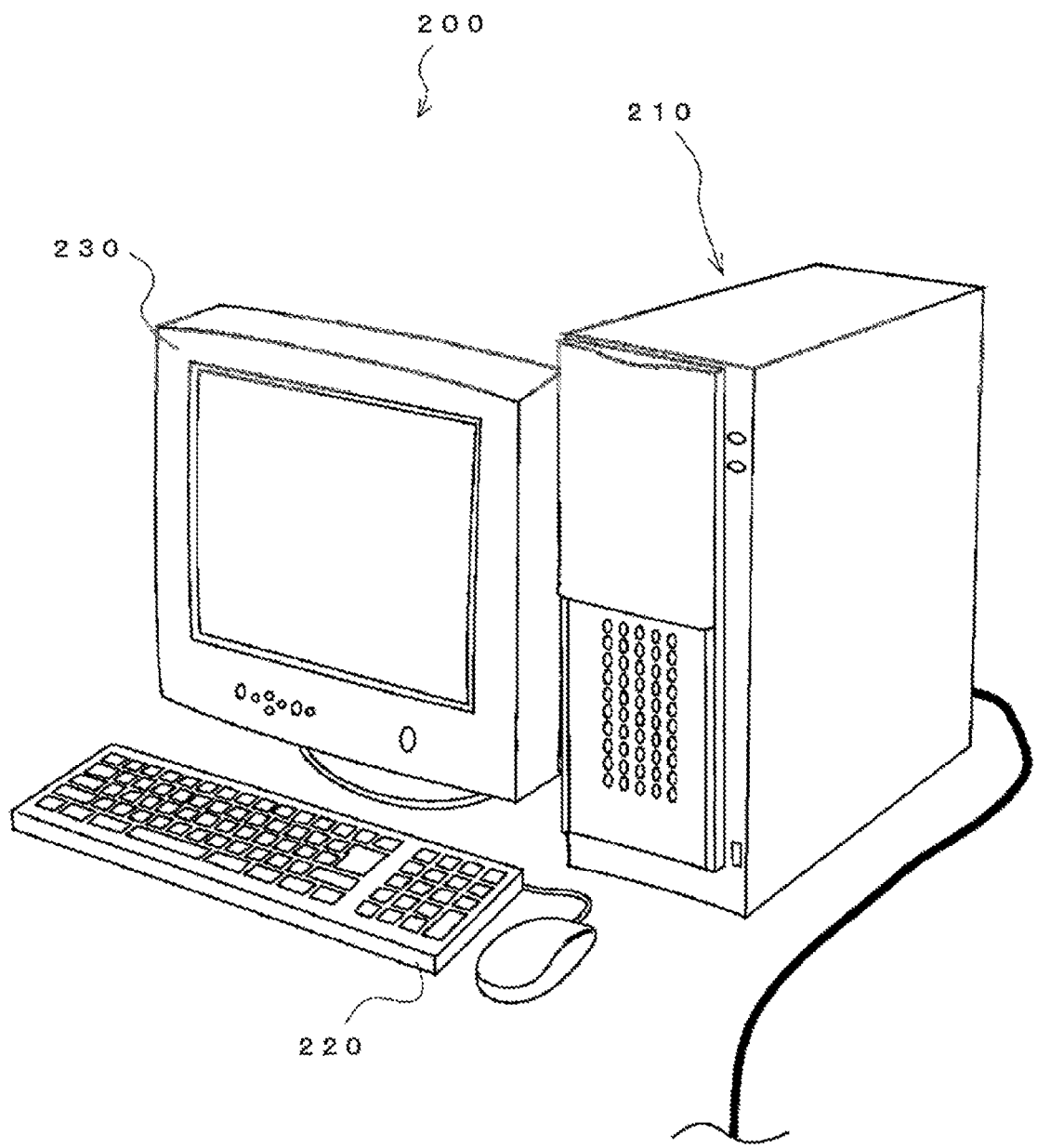

[FIG. 5]
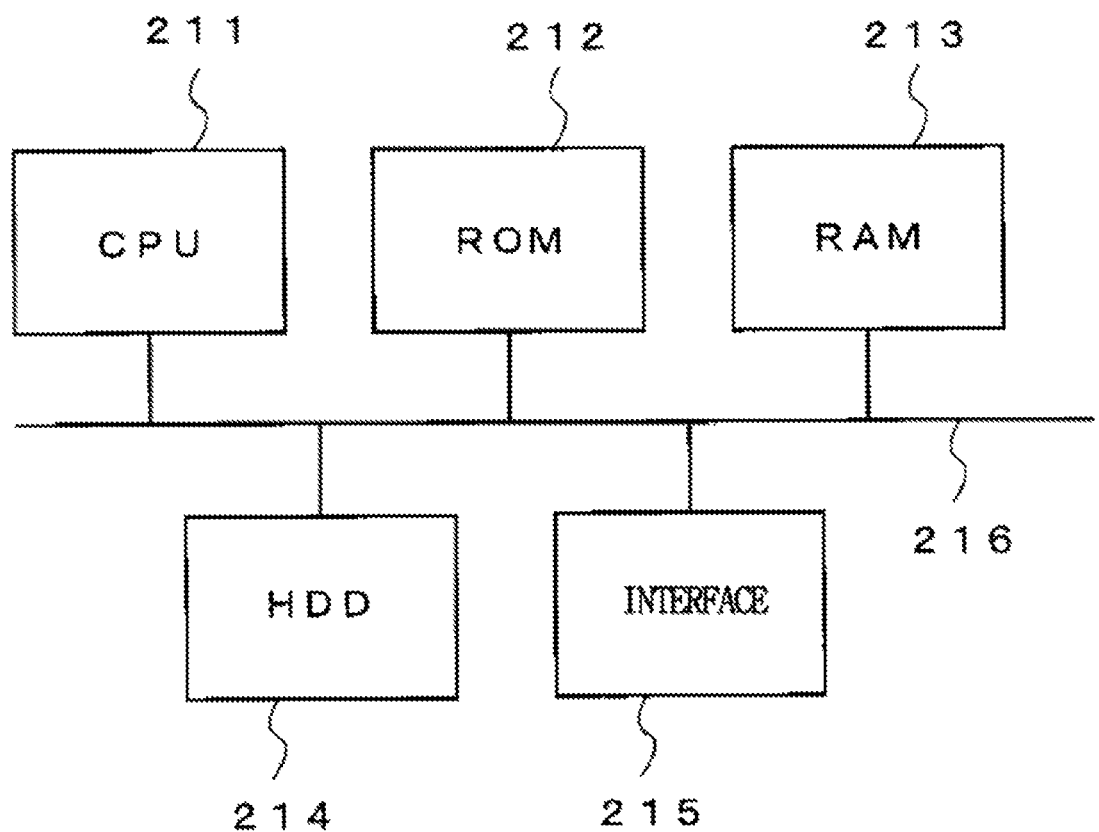

[FIG. 6]
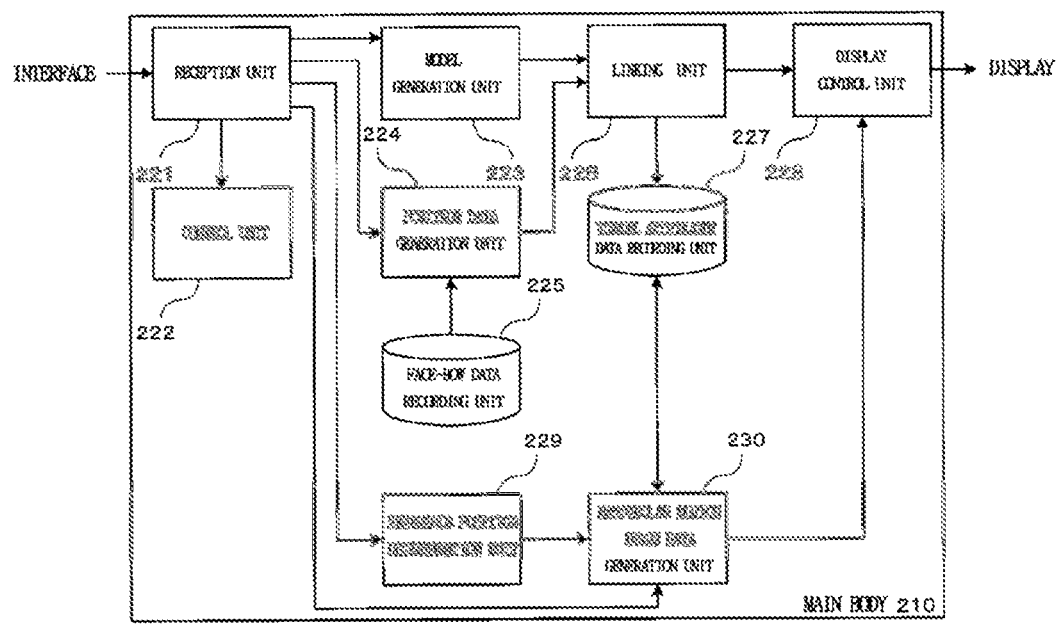

[FIG. 7]
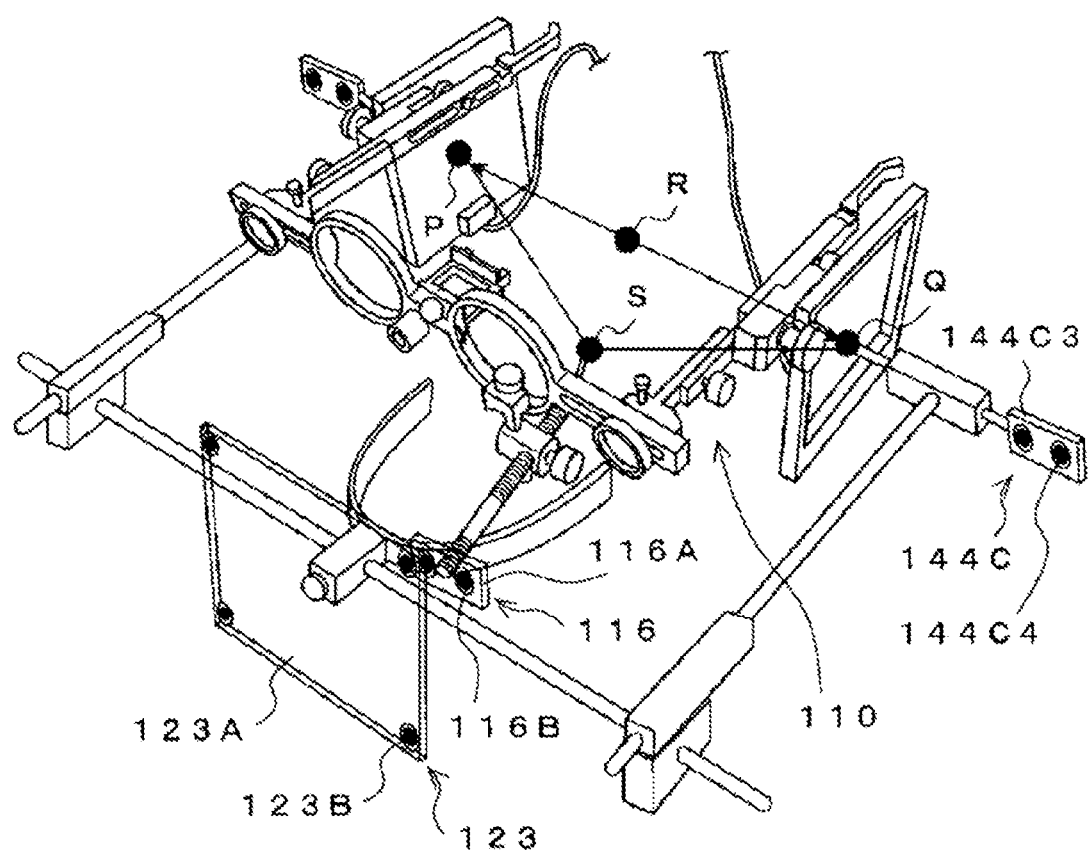

[FIG. 8]
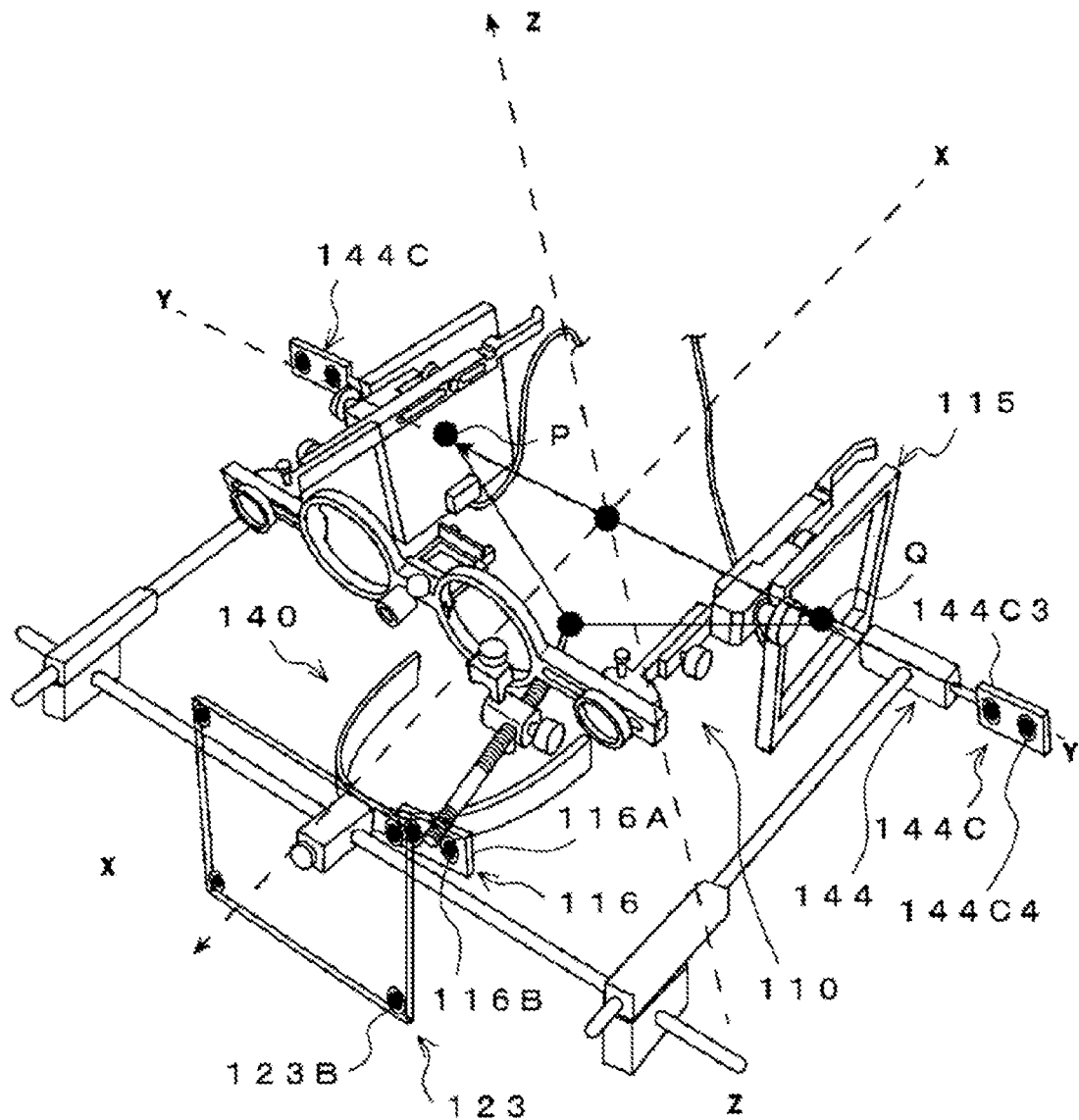

COMPUTER, COMPUTER-IMPLEMENTED METHOD, COMPUTER PROGRAM, AND FACE-BOW

DETAILED DESCRIPTION OF INVENTION

Technical Field

The present invention relates to a computer used in dentistry medical field, and in particular, to a computer used in combination with a face-bow.

Background Art

A face-bow is used in dentistry field. For example, when dental prosthesis treatment, jaw joint occlusion treatment, or occlusion diagnosis is performed, a face-bow is used. The most general face-bow is an instrument for measuring and recording a relative positional relationship including angle, for example, between an anatomical reference surface of a cranium (for example, a Frankfort plane passing through a lower margin of eye socket on the right side of the cranium and left and right upper margins of external auditory canals, sometimes hereinafter simply referred to as "reference surface") and a maxillary dental arch or an upper jaw bone.

A face-bow is, roughly, configured to comprise an upper-bow adapted to be fixedly securable to the face of a patient by uniquely determining a relationship relative to an anatomical reference surface assumed in the cranium of the patient, and a bite-fork adapted to be fixedly securable to the maxillary dental arch of the patient while recording the fixed state, and a connecting means that can arbitrarily position the upper-bow and the bite-fork at relative positions and angles, and can fixedly secure them while recording the positions and angles thereof.

There are several kinds of face-bows.

An upper-bow of a certain kind of face-bow is, for example, eyeglass-like. The upper-bow is equipped with a main body portion corresponding to a frame, if it is an eyeglass positioned in front of the face during its use, and a temple portion corresponding to a temple, if it is eyeglass attached on both sides of the main body portion. The tip of the temple portion is bent inwardly, for example, so as to be insertable into the patient's external auditory canals. A retaining device is attached for securing to arbitrary recessed part of root of nose of the patient on closer side to the face of the main body portion during use of the upper-bow. A position of the tip of the temple portion is made so as to be movable, for example, right and left, and back and forth, relative to the reference surface. Also, a retaining device to be secured to the foregoing recessed part of root of nose is made so as to be movable, for example, back and forth, and up and down, relative to the foregoing reference surface.

During use of the face-bow, both tips of the temple portions are insertably retained within both external auditory canals of the patient, and the retaining device is secured to the recessed part of root of nose. In this state, the main body portion of the upper-bow is adjusted so as to become a predetermined posture (for example, parallel to the reference surface of the cranium). The upper-bow is uniquely positioned relative to the cranium, in more detail, relative to anatomical reference surface by three areas: both tips of the temple portions and the tip of the rod.

The bite-fork is plate-shaped body and U-shaped corresponding to the dental arch occlusion surface, and is fixedly secured to the lower face of the maxillary dental arch by coating printing paste serving as curable substance such as modeling compound or bite wax on its upper face. The relationship between the bite-fork and the maxillary dental arch can be recorded by the shape of the lower face of the maxillary dental arch printed with the printing paste.

The connecting means is composed of a rod body connected by, for example, a plurality of ball joints, and is adapted to be able to arbitrarily position at the relative position and angle and fixedly secure the upper-bow and the bite-fork. The predetermined scales are marked on the ball joint and the rod body, thereby a posture of the connecting means that has taken a certain posture (for example, positions and angles of the ball joint and the rod body connected thereto) is made so as to recordable.

The upper-bow of the face-bow, as described above, can be uniquely positioned relative to the reference surface. Since a posture of the connecting means that connects the bite-fork to one end thereof and connects the upper-bow to the other end thereof is made so as to be recordable, a relative positional relationship in relation to the upper-bow is made so as to be indirectly recordable, and as a result, the relative positional relationship in relation to the reference surface is made so as to be recordable. Then, a relative position and angle of the lower face of the maxillary dental arch of the patient in relation to the bite-fork are made so as to be recordable via the printing paste, and a relative positional relationship between the bite-fork and the reference surface is made so as to be recordable as described above. As a result, the positions and angles of the reference surface and the maxillary dental arch of the patient will be recordable.

The face-bow, in this manner, records a relative positional relationship including angle between the reference surface and the maxillary dental arch, which is unique to individual patient.

Recording about the relative positional relationship between the reference surface and the maxillary dental arch measured by the face-bow is generally utilized in an articulator. In the articulator, as described below, a physical model of the maxillary dental arch, and a physical model of the mandibular dental arch of the patient are combined together, but therein in order to reproduce a bite between the maxillary dental arch and the mandibular dental arch in the living organism of the patient, the foregoing recording is used. An operation to transfer the bite of the living organism of the patient to the articulator in this manner is generally referred to as "face-bow transfer".

The articulator comprises a member corresponding to the upper jaw and a member corresponding to the lower jaw in the cranium. The member corresponding to the upper jaw and the member corresponding to the lower jaw in the cranium are configured to be openable and closable, similarly to the upper jaw and the lower jaw in the living organism, and the physical model of the maxillary dental arch of the patient that has been precisely reproduced, for example, by making teeth mold of the patient is made so as to be attachable to the member corresponding to the upper jaw, and the physical model of the mandibular dental arch of the patient is made so as to be attachable to the member corresponding to the lower jaw.

In this state, by reproducing the positional relationship between the foregoing reference surface and the lower face of the maxillary dental arch measured by the face-bow on the articulator, the relative positional relationship between the reference surface and the maxillary dental arch in the living organism of the patient is made so as to be reproducible, on the articulator.

The relative positional relationship between the lower face of the maxillary dental arch and the upper face of the mandibular dental arch of the patient can be reproduced by recording the bite of the patient, by a well-known method using for example a mouthpiece or compound. If positioning of the upper face of the physical model of the mandibular dental arch of the patient attached to the member corresponding to the lower jaw of the articulator is performed by using the foregoing recording, with respect to the lower face of the physical model of the maxillary dental arch of the patient attached to the member corresponding to the upper jaw of the articulator, then a relative positional relationship among the lower face of the maxillary dental arch, the upper face of the mandibular dental arch in the living patient and the reference surface are reflected on a relative positional relationship among the physical model of the maxillary dental arch attached to the articulator and the physical model of the mandibular dental arch and the reference surface.

As described above, if the articulator is used, then the relative positional relationship between the maxillary dental arch and the mandibular dental arch of the patient in relation to the reference surface can be precisely reproduced, on the articulator. Dentists will be able to perform occlusion diagnosis, by using the physical model of the maxillary dental arch, and the physical model of the mandibular dental arch attached to the articulator, or perform necessary simulation (bite test of dentures, etc.) prior to performing dental prosthesis treatment, or occlusion treatment of temporomandibular anthrosis.

As described above, the relative relationship between the lower face of the maxillary dental arch measured by the face-bow, and the reference surface was generally used, in order that the relationship between the maxillary dental arch attached to the articulator and the reference surface can precisely reproduce the relationship between the reference surface and the maxillary dental arch in the living patient. In other words, the face-bow is largely intended as a device subordinate to the articulator for precisely handling the articulator, and it was time-honored common sense in the dental industry that the articulator is essential for treatment and diagnosis.

However, by the evolution of computer technology, especially image processing technology in recent years, attempts to reproduce a virtual articulator (in other words, three-dimensional images of the maxillary dental arch and mandibular dental arch of a patient, including bite) on a computer have been made. By using the virtual articulator, the need to make a physical model of the dentition of a patient is eliminated, accordingly the speed of diagnosis and treatment can be increased, and data (electronic data) of the virtual articulator used for the diagnosis and treatment of a certain patient can be usefully shared among dentists, for example.

Problems to be Solved by the Invention

However, a technique for using a virtual articulator on a computer has not been significantly widespread. The reason lies in the fact that a proper technique for generating data of a virtual articulator on a computer is not present.

As a method for creating data of a virtual articulator, for example, the following two methods are known. First, in the first method, similarly to conventional one, once an articulator is created, numerical values measured from the articulator are input into a computer, thereby creating data of the virtual articulator. The foregoing numerical values are numerical values representative of, for example, how much a member corresponding to the upper jaw of the articulator, to which the physical model of the maxillary dental arch is attached, is moved back or forth, or up or down from a point serving as a predetermined reference, or how much an occlusion surface of the maxillary dental arch is inclined.

Next, in the second method, the articulator is not used in this case. Instead, this is a method for creating data of a virtual articulator, by combining three-dimensional image of the head of the patient photographed by, for example, CT (Computed Tomography) imaging apparatus or the like, with images of the maxillary dental arch and the mandibular dental arch of the patient three-dimensionally photographed separately from that.

However, there is a reason why diagnosis or treatment by using data of a virtual articulator is not widespread even if the foregoing two methods are used.

First, in the first method, it is necessary to make respective physical models of the maxillary dental arch and the mandibular dental arch, and it is necessary to make actual articulator by using these models, and therefore the speed of diagnosis or treatment cannot be increased. On the contrary, if the articulator is going to be actually made, it is likely to give an impression to dentists that creating the data of the virtual articulator will solely increase time and effort, and therefore it is difficult to motivate dentists to utilize the data of the virtual articulator.

In the second method, an articulator is not actually made, but instead an apparatus like CT imaging apparatus that can perform three-dimensional photography of the patient's head becomes necessary. The apparatus that can perform such three-dimensional photography is generally very expensive, and the penetration rate to dental clinics is not high. Therefore, the second method based on the premise that an apparatus that can perform such three-dimensional photography is preset, hardly spreads. Further, since three-dimensional photography of the patient's head mostly requires the patient to be exposed to radiation, it is unfavorable for the patient.

The claimed invention provides an inexpensive and easy-to-spread technique for creating data of a living organism and a virtual articulator on a computer, without the need to actually create an articulator.

Means for Solving the Problems

In order to solve the foregoing problems, the inventor proposes the following invention.

The claimed invention is A virtual articulator data generation device capable of generating virtual articulator data which is data of a virtual articulator, by using images of a face-bow comprising an upper-bow fixedly securable to a cranium of a patient, keeping the relative positional relationship including angle in relation to a predetermined reference surface in the cranium of the patient uniquely determined, and a bite-fork fixedly securable to an lower face of a maxillary dental arch of the patient by coating curable substance, which are precisely mounted on the patient.

The virtual articulator data generation device of the claimed invention comprises a reception means for receiving maxillary dental arch image data which is data of a maxillary dental arch image defined as an image of a maxillary dental arch, mandibular dental arch image data which is data of a mandibular dental arch image defined as an image of a mandibular dental arch, upper-part image data which is data of an upper-part image defined as an image representative of the relative positional relationship including angle between the bite-fork and a lower face of the maxillary dental arch, relative position image data which is data of relative position images defined as images, in which the upper-bow and the bite-fork are collectively reflected, and representative of the relative positional relationship including angle between the upper-bow and the bite-fork, and occlusal image data which is data of occlusal images defined as images representative of a bite state of the maxillary dental arch and the mandibular dental arch;

a model generation means for generating maxillary dental arch model data which is data of a maxillary dental arch model defined as a three-dimensional model of the maxillary dental arch from the maxillary dental arch image data received from the reception means, as well as generating mandibular dental arch model data which is data of a mandibular dental arch model defined as a three-dimensional model of the mandibular dental arch from the mandibular dental arch image data received from the reception means;

a position data generation means for obtaining a relative position of the maxillary dental arch including angle in relation to the reference surface in a living patient, from the upper-part image data, and the relative position image data received from the reception means, generating first position data which is data about a position of the maxillary dental arch model relative to a virtual reference surface which is a phantom reference surface, as well as obtaining a relative position of the mandibular dental arch including angle in relation to the maxillary dental arch from the occlusal image data received from the reception means, generating second position data which is data about a position of the mandibular dental arch model relative to the maxillary dental arch model; and a linking means for receiving the maxillary dental arch model data, and the mandibular dental arch model data from the model generation means, as well as receiving the first position data, and the second position data from the position data generation means, and generating the virtual articulator data, so that the relative positional relationship between the maxillary dental arch and the mandibular dental arch in relation to the reference surface in the living patient is reproduced in the positional relationship between the maxillary dental arch model and the mandibular dental arch model relative to the virtual reference surface by using the first position data, and the second position data.

This virtual articulator data generation device generates the virtual articulator data which is data of the virtual articulator, by using maxillary dental arch image data which is data of a maxillary dental arch image defined as an image of the maxillary dental arch input from the reception means, and mandibular dental arch image data which is data of a mandibular dental arch image defined as an image of the mandibular dental arch. Specifically, the virtual articulator data generation device of the claimed invention comprises the model generation means for generating maxillary dental arch model data which is data of the maxillary dental arch model defined as a three-dimensional model of the maxillary dental arch, from the maxillary dental arch image data received from the reception means, as well as generating mandibular dental arch model data which is data of the mandibular dental arch model defined as a three-dimensional model of the mandibular dental arch from mandibular dental arch image data received from the reception means. In this virtual articulator data generation device, the maxillary dental arch model based on the maxillary dental arch model data generated by the model generation means, and the mandibular dental arch model based on the mandibular dental arch model data, are used in the virtual articulator as substitutable for the model of the maxillary dental arch and the model of the mandibular dental arch in a general articulator. Thereby, if this virtual articulator data generation device is used, neither the model of the maxillary dental arch, nor the model of the mandibular dental arch is necessary.

Now, in order to generate virtual articulator data by using the maxillary dental arch model and the mandibular dental arch model, what positional relationship including angle exists between the maxillary dental arch model and the mandibular dental arch model must be determined, so that the positional relationship including angle between the maxillary dental arch and the mandibular dental arch in the living patient is precisely reproduced, in other words, the maxillary dental arch model and the mandibular dental arch model must be aligned in such a manner as to correspond to the maxillary dental arch and the mandibular dental arch of the patient.

In this virtual articulator data generation device, the foregoing alignment between the maxillary dental arch model and the mandibular dental arch model is performed by using the upper-part image data which is data of the upper-part images defined as images representative of the relative positional relationship including angle between the bite-fork and the maxillary dental arch lower face, and the relative position image data which is data of relative position images defined as images in which the upper-bow and the bite-fork are collectively reflected, and representative of the relative positional relationship including angle between the upper-bow and the bite-fork, and occlusal image data which is data of occlusal images defined as images representative of an occlusal state between the maxillary dental arch and the mandibular dental arch. In order to make it possible, the reception means of this virtual articulator data generation device is made so as to receive the foregoing three kinds of data used for the alignment thereof in addition to the input of the maxillary dental arch image data and the mandibular dental arch image data. Processing executed by the virtual articulator data generation device of the claimed invention generally follows the procedure when performing face-bow transfer from the upper-bow to a real articulator, but manages to identify the relative positional relationship between the upper-bow and the bite-fork by image processing based on the relative position image data. This point never exists in the conventional concept of the face-bow transfer. Moreover, by identifying the relative positional relationship between the upper-bow and the bite-fork by using the relative position images as described above, the connecting means for connecting the upper-bow and the bite-fork, which was conventionally necessary, becomes unnecessary. By such technique, the claimed invention enables simply generating the virtual articulator data, without making dentists to spend excessive effort, even if there is no such expensive apparatus as CT imaging apparatus.

In the virtual articulator data generation device of the claimed invention, the data used for the foregoing alignment is generated by the position data generation means. The position data generation means obtains relative position including angle of the maxillary dental arch in relation to the reference surface in the living patient, from the upper-part image data, and the relative position image data, and generates first position data which is data about a position of the maxillary dental arch model relative to virtual reference surface which is a phantom reference surface. The first position data, in the actual articulator, corresponds to information for determining a position of the model of the maxillary dental arch relative to the reference surface. The position data generation means also obtains the relative position including angle of the mandibular dental arch in relation to the maxillary dental arch, from the occlusal image data, and generates second position data which is data about a position of the mandibular dental arch relative to the maxillary dental arch model. The second position data, in the actual articulator, corresponds to information for determining a position of the upper face of the mandibular dental arch relative to the lower face of the maxillary dental arch.

Then, in the virtual articulator data generation device of the claimed invention, the linking means generates virtual articulator data, by performing alignment between the maxillary dental arch model and the mandibular dental arch model, by using the first position data and the second position data.

The virtual articulator data generation device of the claimed invention is as follows and can obtain favorable effects of being capable of generating the virtual articulator data, in easy manner, at low cost. In other words, the virtual articulator data generation device of the present application eliminates the need to make the model of the maxillary dental arch and the model of the mandibular dental arch, as described already, in generating the virtual articulator data, and will never require dentists to introduce expensive apparatus for performing three-dimensional photography of the head, and will never require patients to be exposed by three-dimensional photography of the head.

The maxillary dental arch image, the mandibular dental arch image, the upper-part images, the occlusal images, the relative position images in the present application may be all two-dimensional images or three-dimensional image. The lower-part images as will be described below may be also similarly two-dimensional images, or three-dimensional images.

The occlusal images used in the virtual articulator data generation device of the present application are images representative of a bite state of the maxillary dental arch and the mandibular dental arch of the patient, as described above, but this may be, for example, images in which a biting portion of the maxillary dental arch and the mandibular dental arch of the patient is projected, or may be images of printing paste that can print the shapes of the maxillary dental arch and the mandibular dental arch, occluded between the maxillary dental arch and the mandibular dental arch of the patient.

Whichever image may be used, an occlusal state of the maxillary dental arch and the mandibular dental arch of the patient can be reproducibly recorded.

For example, in the case where an image of the printing paste which can print the shapes of the maxillary dental arch and the mandibular dental arch is extraorally picked up, occlusal images which are three-dimensional images can be picked up by using general-purpose three-dimensional image pickup apparatus for dental technicians.

The relative position images, as described above, are images in which the upper-bow and the bite-fork are collectively projected, and if they are images representing the relative positional relationship including angle between the upper-bow and the bite-fork, their details do not matter.

The relative position images may be images in which the first reference object attached to the upper-bow so that the positional relationship including angle relative to the upper-bow becomes a predetermined relationship, the second reference object attached to the bite-fork so that the positional relationship including angle relative to the bite-fork becomes a predetermined relationship are projected together with the upper-bow and the bite-fork. If a relationship between the first reference object and the upper-bow is fixed, and a relationship between the second reference object and the bite-fork is fixed, then the relative positional relationship between the upper-bow and the bite-fork can be simply identified, only by identifying the relative position between the first reference object and the second reference object. Then, if the first reference object and the second reference object exist, identification of the relative positional relationship between the upper-bow and the bite-fork can be performed, by simple image processing.

In this case, the position data generation means may be configured to detect the positional relationship including angle between the upper-bow and the bite-fork, by performing image processing on the relative position images, by using data about a predetermined positional relationship between the first reference object and the upper-bow, and a predetermined positional relationship between the second reference object and the bite-fork.

The relative position images may be at least two two-dimensional images in which the first reference object and the second reference object, which have been picked up from a plurality of directions, are projected, and the relative position image data may be data about at least two of the relative position images. Thereby, the relative position images can be picked up by two-dimensional images that can be picked up with an ordinary camera.

The relative position images are at least one three-dimensional image in which the first reference object and the second reference object are projected, and the relative position image data may be data about at least one of the relative position images. Thereby, although a camera for picking up three-dimensional image is necessary, the number of sheets of images can be decreased.

The inventor also provides the following method in which advantageous effects similar to those in the above mentioned virtual articulator data generation device can be obtained.

This method is a virtual articulator data generation method executed by a virtual articulator data generation device having a computer, capable of generating virtual articulator data which is data of a virtual articulator, by using images of a face-bow comprising an upper-bow fixedly securable to a cranium of a patient keeping the relative positional relationship including angle in relation to a predetermined reference in the cranium of the patient uniquely determined, and a bite-fork fixedly securable to an lower face of a maxillary dental arch of the patient, by coating curable substance, which are precisely mounted to the patient.

Then this method comprises a reception process for receiving maxillary dental arch image data which is data of maxillary dental arch image defined as an image of a maxillary dental arch, mandibular dental arch image data which is data of a mandibular dental arch image defined as an image of a mandibular dental arch, upper-part image data which is data of an upper-part image defined as an image representative of the relative positional relationship including angle between the bite-fork and a lower face of the maxillary dental arch, relative position image data which is data of a relative position image defined as an image, on which the upper-bow and the bite-fork are collectively reflected, and representative of the relative positional relationship including angle between the upper-bow and the bite-fork, and occlusal image data which is data of occlusal images defined as images representative of an occlusal state of the maxillary dental arch and the mandibular dental arch, a model generation process for generating maxillary dental arch model data which is data of a maxillary dental arch model defined as a three-dimensional model of the maxillary dental arch, from the maxillary dental arch image data received from the reception means, as well as generating mandibular dental arch model data which is data of a mandibular dental arch model defined as a three-dimensional model of the mandibular dental arch, from the mandibular dental arch image data received from the reception means, a position data generation process for obtaining relative position including angle of the maxillary dental arch in relation to the reference surface in a living patient, from the upper-part image data and the relative position image data received from the reception means, generating first position data which is data about a position of the maxillary dental arch model relative to a virtual reference surface which is a phantom reference surface, as well as obtaining relative position including angle of the mandibular dental arch in relation to the maxillary dental arch, from occlusal image data received from the reception means, generating second position data which is data about a position of the mandibular dental arch model relative to the maxillary dental arch model, and a linking process for receiving the maxillary dental arch model data, and the mandibular dental arch model data from the model generation means, as well as receiving the first position data, and the second position data from the position data generation means, and generating the virtual articulator data, so that the relative positional relationship of the maxillary dental arch and the mandibular dental arch to the reference surface in the living patient is reproduced in the positional relationship of the maxillary dental arch model and the mandibular dental arch model to the virtual reference surface by using the first position data and the second position data, which are executed by the computer.

The inventor also provides the following computer program in which advantageous effects similar to those in the above mentioned virtual articulator data generation device can be obtained.

The computer program is A computer program for causing a computer to act as a virtual articulator data generation device, capable of generating virtual articulator data which is data of a virtual articulator, by using images of a face-bow comprising, an upper-bow fixedly securable to a cranium of a patient keeping a relative positional relationship including angle in relation to a predetermined reference surface in the cranium of the patient uniquely determined, and a bite-fork fixedly securable to a lower face of a maxillary dental arch of the patient by coating curable substance, which are precisely mounted on the patient.

Then this computer program for causing the computer to act as, a reception means for receiving maxillary dental arch image data which is data of a maxillary dental arch image defined as an image of a maxillary dental arch, mandibular dental arch image data which is data of a mandibular dental arch image defined as an image of a mandibular dental arch, upper-part image data which is data of an upper-part image defined as an image representative of the relative positional relationship including angle between the bite-fork and a lower face of the maxillary dental arch, relative position image data which is data of a relative position image defined as an image in which the upper-bow and the bite-fork are collectively reflected, and representative of the relative positional relationship including angle between the upper-bow and the bite-fork, and occlusal image data which is data of occlusal images defined as images representative of an occlusal state of the maxillary dental arch and the mandibular dental arch, a model generation means for generating maxillary dental arch model data which is data of a maxillary dental arch model defined as a three-dimensional model of the maxillary dental arch from the maxillary dental arch image data received from the reception means, as well as generating mandibular dental arch model data which is data of a mandibular dental arch model defined as a three-dimensional model of the mandibular dental arch from the mandibular dental arch image data received from the reception means, a position data generation means for obtaining relative position including angle of the maxillary dental arch to the reference surface in a living patient, from the upper-part image data, and the relative position image data received from the reception means, generating first position data which is data about a position of the maxillary dental arch model relative to a virtual reference surface which is a phantom reference surface, as well as obtaining relative position including angle of the mandibular dental arch in relation to the maxillary dental arch, from occlusal image data received from the reception means, generating second position data which is data about a position of the mandibular dental arch model relative to the maxillary dental arch model, and a linking means for receiving the maxillary dental arch model data, and the mandibular dental arch model data from the model generation means, as well as receiving the first position data and the second position data, from the position data generation means, and generating the virtual articulator data, so that the relative positional relationship of the maxillary dental arch and the mandibular dental arch to the reference surface in the living organism is reproduced in the positional relationship of the maxillary dental arch model and the mandibular dental arch model to the virtual reference surface, by using the first position data and the second position data.

The inventor also proposes the following face-bow as an aspect the claimed invention usable in combination with the above mentioned virtual articulator data generation device.

One example thereof is a face-bow comprising an upper-bow fixedly securable to a cranium of a patient keeping the relative positional relationship including angle in relation to a predetermined reference surface in the cranium of the patient uniquely determined, and a bite-fork fixedly securable to a lower face of a maxillary dental arch of the patient by coating curable substance. Then, a first reference object of which the positional relationship including angle relative to the upper-bow has been made to be a predetermined relationship is attached to the upper-bow, and a second reference object of which positional relationship including angle relative to the bite-fork has been made to be a predetermined relationship is attached to the bite-fork, the face-bow is configured to allow the relative positional relationship including angle of the upper-bow to the bite-fork to be obtained, by using the relative positional between the first reference object and the upper-bow, the relative positional relationship between the second reference object and the bite-fork, and the relative positional relationship between the first reference object and the second reference object, based on images of the upper-bow and the bite-fork photographed so that the first reference object and the second reference object are projected together.

At least one of the first reference object and the second reference object may be characters, symbols, or graphics provided on a transparent body connected to either the upper-bow or the bite-fork. The reason why a material on which the first reference object and the second reference object are provided should be a transparent body is that, if the said material is a transparent body, compared with when the said material is opaque, it hardly causes a situation that the upper-bow and the bite-fork are hidden by the said material and not projected on the relative position image. The transparent body may be, for example, plate-shaped. In this case, the plate-shaped transparent body may have the same thickness at every part. If the transparent body has different thicknesses, it may act as a lens, and therefore there is a possibility that an image of the upper-bow or the bite-fork located at the rear side of the transparent body in the relative position image may be deflected. Because such a deflection obstructs identification of the relative position of the upper-bow and the bite-fork by image processing, it is beneficial to prevent the transparent body from acting as a lens.

At least one of the first reference object and the second reference object may be a sphere connected to either the upper-bow or the bite-fork. Thereby, the relative positional relationship between the upper-bow and the bite-fork can be also identified by image processing. Connection of the first reference object and the upper-bow, and connection of the second reference object and the bite-fork can be performed by, for example, a rod body with a predetermined length.

The inventor also proposes as an aspect of the claimed invention, the following attachment suitable for making existing face-bow to act as the above mentioned face-bow that can be used in combination with the virtual articulator data generation device.

The attachment is an attachment for face-bow which is an object attachable to a face-bow comprising an upper-bow fixedly securable to the cranium of the patient, keeping the relative positional relationship including angle in relation to a predetermined reference surface in a cranium of a patient uniquely determined, and a bite-fork fixedly securable to an lower face of a maxillary dental arch of the patient by coating curable substance, including a first reference object made to be attachable to the upper-bow so that the positional relationship including angle relative to the upper-bow becomes a predetermined relationship, and a second reference object made to be attachable to the bite-fork so that the positional relationship including angle relative to the bite-fork becomes a predetermined relationship, the attachment for face-bow for allowing the relative positional relationship including angle of the upper-bow to the bite-fork to be obtained, by using the relative positional relationship between the first reference object and the upper-bow, the relative positional relationship between the second reference object and the bite-fork, and the relative positional relationship between the first reference object and the second reference object, based on images of the upper-bow and the bite-fork, photographed so that the first reference object and the second reference object are projected together.

The inventor also proposes the following mandibular motion recording device.

One example thereof is a mandibular motion recording device used in combination with a mandibular motion detection device having an output means for measuring a position of a lower jaw relative to a cranium of a patient, which change with a mandibular motion which is a motion of the lower jaw of the patient, as well as outputting motion data which is data about a position of the lower jaw relative to the cranium of the patient.

Then, the mandibular motion recording device comprises a recording means for recording virtual articulator data which is data about a virtual articulator of a patient, a second reception means for receiving the motion data from the output means, a third reception means for receiving data of a reference image which is an image by which a position of the lower jaw of the patient at a reference position can be identified, a reference position identification means for identifying from the motion data, a position of the lower jaw of the patient at the time when the reference image based on the reference image data received by the third reception means is projected, and a rendering means for writing a mark representative of a mandibular motion of the patient, by using the position of the lower jaw identified by the reference position identification means as the reference position, on a three-dimensional image of the virtual articulator identified according to the virtual articulator data, based on the motion data received by the second reception means, and the virtual articulator data read from the recording means.

Since the lower jaw not only performs rotational motion relative to the cranium about a hinge-like jaw joint, but also moves back and forth, and right and left relative to the cranium, it is preferable to record mandibular motion in order to reproduce precisely the bite of the patient. From such a point of view, an attempt to record the mandibular motion of the patient is being made. Then to this end, there is used the mandibular motion recording device used in combination with the mandibular motion detection device having the output means for measuring a position of the lower jaw relative to the cranium of the patient, which changes with the mandibular motion which is a motion of the lower jaw of the patient, as well as outputting motion data which is data of a position of the lower jaw of relative to the cranium the patient. Indeed, general-purpose mandibular motion recording device is configured to detect a motion of the lower jaw relative to the cranium, by using a flag uniquely fixed to the reference surface assumed on the patient's cranium, and a stylus provided on the under-bow fixed to the patient's mandibular dental arch, from the relative positional relationship between the stylus and the flag that move following the movement of the lower jaw.

However, even if the mandibular motion which is the motion of the lower jaw relative to the cranium is detected by using, for example, the flag and the stylus, and the data thereof is recorded, it is extremely difficult to reproduce the mandibular motion on an actual articulator. As a tool for reproducing the mandibular motion, generally, a semi-adjustable articulator is used, wherein tracks of the mandibular motion by right and left jaw joints are set with arbitrary plural kinds of variations, using an angle from respective center positions of right and left mandibular condyles to a front position of about 12 mm, and a curve of the tracks. However, the above curve is only an average value calculated from many persons, and thus it is difficult to mention the mandibular motion reproduced thereby as an accurate copy of a motion unique to each patient. Likewise even with the virtual articulator on a computer, no proper techniques for reproducing mandibular motion of living organisms exist.

The mandibular motion recording device of the present application comprises a rendering means for writing a mark representing the mandibular motion of the patient, on a three-dimensional image of the virtual articulator identified according to the virtual articulator data, based on the motion data received by the second reception means, and virtual articulator data read from the recording means. By displaying the three-dimensional image of the virtual articulator on which such a rendering means has performed rendering, on a display connected to the mandibular motion recording device, for example, a dentist who sees it, will be able to intuitively, precisely grasp the mandibular motion of the patient which the mandibular motion detection device has detected. Indeed, if the position of the foregoing mark is not accurate, then it is not guaranteed that the mandibular motion of the patient which the dentist has grasped is accurate. In the mandibular motion recording device, this is secured by the third reception means for receiving data of the reference image which is an image by which the position of the lower jaw of the patient in the reference position can be identified, and the reference position identification means for identifying from the motion data, the position of the lower jaw of the patient at the time when the reference image based on the reference image data received by the third reception means is projected. Positions of marks can be adjusted that are sequentially put to images of the virtual articulator according to the motion data which is temporally and continuously input, by using the position of the lower jaw identified based on the reference image at a certain moment, as the reference position (initial position, or base position) of the mandibular dental arch in the virtual articulator. The reference image may be, for example, an image by which the relative position of the lower jaw (or the mandibular dental arch) in relation to the patient's head or the reference surface can be grasped, for example, such an image by which the relative positional relationship between the upper-bow and the lower bow can be identified will be its example.

Favorable effects similar to those in the mandibular motion recording device can be also obtained by, for example, the following method.

The method is a mandibular motion recording method executed by a mandibular motion recording device including a computer, used in combination with a mandibular motion detection device having an output means for measuring a position of a lower jaw relative to a cranium of a patient, which changes with a mandibular motion which is a motion of the lower jaw of the patient, as well as outputting motion data which is data about a position of the lower jaw relative to the cranium of the patient.

Then this method comprises a recording processing for recording virtual articulator data which is data about a virtual articulator of the patient, a second reception processing for receiving the motion data from the output means, a third reception processing for receiving data of reference image which is an image by which a position of the lower jaw of the patient at a reference position can be identified, a reference position identification processing for identifying from the motion data, a position of the lower jaw of the patient at the time when the reference image based on the reference image data received by the third reception processing is projected, and a rendering processing for writing a mark representative of the mandibular motion of the patient, by using the position of the lower jaw identified by the reference position identification processing as the reference position, on a three-dimensional image of the virtual articulator identified according to the virtual articulator data, based on the motion data received by the second reception processing, and the virtual articulator data read from the recording processing, which are executed by the computer.

Favorable effects similar to those in the foregoing mandibular motion recording device can be also obtained by, for example, the following computer program.

Then this computer program is a computer program for causing a computer to act as a mandibular motion recording device, used in combination with a mandibular motion detection device having an output means for measuring a position of a lower jaw relative to a cranium of a patient, which changes with a mandibular motion which is a motion of the lower jaw of the patient, as well as outputting motion data which is data about a position of the lower jaw relative to the cranium of the patient.

Then, this computer program for causing the computer to act as a recording means for recording virtual articulator data which is data about a virtual articulator of a patient, a second reception means for receiving the motion data from the output means, a third reception means for receiving data of a reference image which is an image by which a position of the lower jaw of the patient at a reference position can be identified, a reference position identification means for identifying from the motion data, a position of the lower jaw of the patient at the time when the reference image based on the reference image data received by the third reception means is projected, and a rendering means for writing a mark representative of mandibular motion of the patient, by using the position of the lower jaw identified by the reference position identification means as the reference position, on a three-dimensional image of the virtual articulator identified according to the virtual articulator data, based on the motion data received by the second reception means, and the virtual articulator data read from the recording means.

The inventor proposes the following invention, as another example of the mandibular motion recording device.

This mandibular motion recording device is a mandibular motion recording device, used in combination with a mandibular motion detection device having an output means for measuring a position of a lower jaw of a patient relative to a cranium of a patient, which changes with a mandibular motion which is a motion of the lower jaw of the patient, as well as outputting motion data which is data about a position of the lower jaw of the patient relative to the cranium of the patient.

Then, this mandibular motion recording device comprises a recording means for recording virtual articulator data which is data about a virtual articulator of a patient, a second reception means for receiving the motion data from the output means, a third reception means for receiving data of a reference image which is an image by which a position of the lower jaw of the patient at a reference position can be identified, a reference position identification means for identifying from the motion data, a position of the lower jaw of the patient at the time when the reference image according to the reference image data received by the third reception means is projected, and a moving image rendering means for causing the lower jaw in a three-dimensional image of the virtual articulator identified according to the virtual articulator data, based on the motion data received by the second reception means, and the virtual articulator data read from the recording means to perform mandibular motion by animation so as to reproduce the mandibular motion, by using the position of the lower jaw identified by the reference position identification means as the reference position.

In contrast to the foregoing mandibular motion recording device comprising the rendering means for writing a mark on an image of the virtual articulator, this mandibular motion recording device comprises a moving image processing means for causing the lower jaw to perform mandibular motion on an image of the virtual articulator by animation, in place of the rendering means. By displaying moving images by animation of the virtual articulator based on the data generated by the moving image processing means, on the display connected with the mandibular motion recording device, for example, and showing it to a dentist, the dentist will be able to grasp intuitively and precisely the mandibular motion of the patient detected by the mandibular motion detection device. Indeed, if the position of the lower jaw on an image of the virtual articulator that is moving by the animation is not accurate, then it is not guaranteed that the mandibular motion of the patient grasped by the dentist is accurate. This is guaranteed in this mandibular motion recording device by using the reference image, by the method similar to the foregoing mandibular motion recording device.

Favorable effects similar to those of this mandibular motion recording device can be also obtained by, for example, the following method.

This method is a mandibular motion recording method executed by a mandibular motion recording device including a computer, used in combination with a mandibular motion detection device having an output means for measuring a position of a lower jaw of a patient relative to a cranium of a patient, which changes with a mandibular motion which is a motion of the lower jaw of the patient, as well as outputting motion data which is data about a position of the lower jaw of the patient relative to the cranium.

Then, this method comprises a recording processing for recording virtual articulator data which is data about a virtual articulator of a patient, a second reception processing for receiving the motion data from the output means, a third reception processing for receiving data of a reference image which is an image by which a position of the lower jaw of the patient at a reference position can be identified, a reference position identification processing for identifying from the motion data, a position of the lower jaw of the patient at the time when the reference image based on the reference image data received by the third reception processing is projected, and a moving image processing for causing the lower jaw in a three-dimensional image of the virtual articulator identified according to the virtual articulator data, based on the motion data received by the second reception processing, and the virtual articulator data read from the recording processing to perform mandibular motion by animation so as to reproduce the mandibular motion, by using the position of the lower jaw identified by the reference position identification processing as the reference position, which are executed by the computer.

Favorable effects similar to those of the foregoing mandibular motion recording device can be also obtained by, for example, the following computer program.

This computer program is a computer program for causing a computer to act as a mandibular motion recording device, used in combination with a mandibular motion detection device having an output means for measuring a position of the lower jaw relative to a cranium of a patient, which changes with a mandibular motion which is a motion of the lower jaw of the patient, as well as outputting motion data which is data about a position of the lower jaw relative to the cranium of the patient.

Then, this computer program causes the computer to act as a recording means for recording virtual articulator data which is data about a virtual articulator of the patient, a second reception means for receiving the motion data from the output means, a third reception means for receiving data of a reference image which is an image by which a position of the lower jaw of the patient at the reference position can be identified, a reference position identification means for identifying from the motion data, a position of the lower jaw of the patient at the time when the reference image based on the reference image data received by the third reception means is projected, and a moving image processing means for causing the lower jaw in a three-dimensional image of the virtual articulator identified according to the virtual articulator data, based on the motion data received by the second reception means, and the virtual articulator data read from the recording means to perform mandibular motion by animation so as to reproduce the mandibular motion, by using the position of the lower jaw identified by the reference position identification means as the reference position.

BRIEF DESCRIPTION OF THE DRAWINGS

FIG. 1 is a perspective view illustrating the entire configuration of a face-bow according to an embodiment.

FIG. 2 is a perspective view illustrating the configuration of an under-bow included in the face-bow illustrated in FIG. 1.

FIG. 3 is a perspective view illustrating a state in which the upper-bow and the under-bow of the face-bow illustrated in FIG. 1 are combined together.

FIG. 4 is a perspective view illustrating outward appearance of a diagnosis device in an embodiment.

FIG. 5 is a hardware configuration diagram of a main body of the diagnosis device illustrated in FIG. 4.

FIG. 6 is a block diagram illustrating a functional block generated inside the main body of the diagnosis device illustrated in FIG. 4.

FIG. 7 is a diagram conceptually illustrating part of processing for identifying positions of the upper-bow and lower bite-fork performed by a reference position determination unit.

FIG. 8 is a diagram conceptually illustrating part of processing for identifying positions of the upper-bow and lower bite-fork performed by a reference position determination unit.

DETAILED DESCRIPTION OF THE PREFERRED EMBODIMENTS

Hereinbelow, one preferable embodiment of the present invention will be described.

First, a face-bow 100 used in the embodiment will be described.

The face-bow 100 is used when virtual articulator data which is data of a virtual articulator is created. Also, the face-bow 100 is used when a mandibular motion of a patient is recorded by utilizing the virtual articulator data. The face-bow 100 is used in these two cases, but their aspects are different depending on respective cases.

First, the face-bow 100 in the case where it is used for generation of the virtual articulator data will be described. The face-bow 100 in that case is configured as illustrated in the perspective view of FIG. 1.

The face-bow 100 in this case, similarly to a publicly-known face-bow for use in a face-bow transfer, comprises an upper-bow 110 and a bite-fork 120. The face-bow 100 in common use comprises a connection member that connects the upper-bow 110 and the bite-fork 120, but the face-bow 100 in the embodiment does not comprise the connection member. Except for not comprising the connection member, the face-bow 100 in the embodiment may be, basically, a publicly known or general face-bow, but is different from the publicly known face-bow in that a first reference object and a second reference object are attached to the upper-bow 110 and the bite-fork 120, respectively, as described below.

The upper-bow 110 is set so that position adjustment including angle with respect to a patient's head is possible, and is made fixedly securable to the patient's head keeping a positional relationship relative to a predetermined reference surface assumed in the patient's head uniquely determined.

The upper-bow 110 described in the embodiment, as a whole, has a spectacle-like constitution. The upper-bow 110 comprises a main body portion 111 having a frame-like share of eyeglasses, but not limited to this. The main body portion 111 is configured to comprise two frame portions 111A left and right in an annular shape corresponding to the frame of the eyeglasses, though lenses are not added, but not limited to this, a bridge portion 111B that connects both frame portions 111A, and a protector 111C horizontally extending from the outside of the both frame portions 111A.

In the bridge portion 111B, a threaded hole (not illustrated) is drilled in an inner circumferential surface thereof, and a thread 111B1 is threaded together into the hole.

In the protector 111C, a long hole 111C1, which is a hole across substantially overall length in its lengthwise direction is provided.

In the upper-bow 110 of the embodiment, a mounting portion 111D is mounted to the lower part of the one of the frame portions 111A, that is, the frame portion 111A on a left side, but not limited to this. To the mounting portion 111D is mounted a thread 111E vertically penetrating therethrough, and a supporting block 112 is mounted to the lower end of the thread 111E. The supporting block 112 can be rotated with the thread 111E as an axis, by making the thread 111E to rotate. Indeed, it is configured so that this rotation does not occur unless somewhat big force is applied.

The supporting block 112 is used for fixing a positioning rod 113. In the supporting block 112, a hole (illustration is omitted) is drilled across a front-back direction. Also in the supporting block 112, a threaded hole (illustration is omitted) is drilled on an inner circumferential surface thereof perpendicular to the foregoing hole penetrating in the front-back direction, and a thread 112A is threaded together into the hole. The positioning rod 113 includes a horizontal portion 113A that keeps substantial horizontality during use of the face-bow 100 and a vertical portion 113B that keeps substantial perpendicularity during use of the face-bow 100. To the upper end of the vertical portion 113B, a sphere 113B1 for positioning when pressed to the patient's nose during use of the face-bow 100 is attached to the upper end thereof. The horizontal portion 113A is configured so that the positioning rod 113 thereof is inserted into the above-described hole that penetrates through the supporting block 112 in a front-back direction. The horizontal portion 113A of the positioning rod 113 can move forward and backward inside the hole, and can be rotated axially with its center as an axis. The horizontal portion 113A abuts against the tip of the thread 112A tightened by being rotated. When the thread 112A is tightened by being rotated, the horizontal portion 113A is sandwiched between an inner surface of the foregoing hole that penetrates through the supporting block 112 in front-back direction and the thread 112A, and can be fixed with respect to the supporting block 112, while keeping arbitrary position in front-back direction, and arbitrary angle around the axis. When the thread 112A is loosened, the fixation will be released as a matter of fact.

When taking into account that the supporting block 112 is rotatable in substantially horizontal direction relative to the mounting portion 111D, the vertical portion 113B of the positioning rod 113 can be rotated in the horizontal direction around the supporting block 112, and can move forward and backward relative to the supporting block 112, and further can be rotated around an axis thereof.

Similarly to the temples of general eyeglasses, temples 114 that are put on both ears of a patient during use of the face-bow 100 are attached to the protector 111C. The temples 114 include front temple portions 114A close to the protector 111C, and back temple portions 114B attached to the front temple portions 114A.

On the front faces of the front temple portions 114A, holes, whose illustration is omitted, threaded on an inner circumferential surface thereof are drilled towards a lengthwise direction of the temples 114. The long hole 111C1 provided in the protector 111C is passed by the thread 114A1, and the tip of the thread 114A1 is threaded together into the foregoing holes drilled on the front faces of the front temple portions 114A. In a state in which the thread 114A1 is loosened, the thread 114A1 and the front temple portion 114A (to put it briefly, the temple 114) can move in a substantially horizontal direction along the long hole 111C1. When the thread 114A1 is tightened by being rotated, the protector 111C becomes sandwiched between a posterior surface of the head provided on the front side of the thread 114A1 and the front face of the front temple portion 114A. In short, the temple 114 is movable along a lengthwise direction of the protector 111C, and can be fixed to the protector 111C at an arbitrary position.

The back temple portion 114B can move forward and backward relative to the front temple portion 114A, thereby changing an overall length of the temple 114. As a mechanism for allowing the back temple portion 114B to move forward and backward relative to the front temple portion 114A, any mechanism may be adopted, but what is called a rack and pinion structure is adopted in the embodiment. A rack along the lengthwise direction of the front temple portion 114A, whose illustration is omitted, is built in the front temple portion 114A, and a pinion, whose illustration is also omitted, is attached to the thread 114B1 attached to the back temple portion 114B. By turning the thread 114B1, the thread 114B1 engaged with the rack moves forward and backward relative to the rack, so that the back temple portion 114B moves forward and backward relative to the front temple portion 114A.

A flag 115 is attached detachably to the back temple portion 114B. The flag 115 has a function, as a main function thereof, for causing the face-bow described below used when the mandibular motion is recorded to act as a mandibular motion detection device in the claimed invention, in cooperation with a stylus described below. Therefore, the flag 115 may be removed from the back temple portion 114B when the face-bow 100 is used for generation of the virtual articulator data.

The flag 115 includes a surface sensor portion 115A and a frame 115B surrounding it. The flag 115 can be detachably fixed to the back temple portion 114B, by being threaded to the back temple portion 114B via a thread 115C. The sensor portion 115A detects an area touched by a needle-like portion of the stylus described below, and can continuously output the motion data about the area at substantially real time. The flag 115 is connected with a cable 115D, and its tip is connected to a computer described below. The motion data is sent to the computer via the cable 115D.

The flag 115 is also provided with plural, e.g., four third reference members 115E, but not limited to this, in the embodiment. A relative position relationship including angle of four third reference members 115E to the sensor portion 115A is predetermined. Each of the third reference members 115E has a spherical third reference object 115E1, and a rod body 115E2 that connects the third reference object 115E1 to any of four corners of the frame 115B, which is rod-shaped in the embodiment, but not limited to this.

The upper-bow 110 described above is a general upper-bow, but a first reference member 116 that constitutes a part of attachment in the present application is attached to the upper-bow 110 in the embodiment.

The first reference member 116 comprises a first main body member 116A composed of a transparent body. The first main body member 116A is composed of transparent resin or transparent glass. The first main body member 116A is plate-shaped, but not limited to this, and its thickness is made equal at every part thereof, but not limited to this. The first main body member 116A is rectangular as a whole, but not limited to this, and thereunder is formed a notch portion 116A1, which is isosceles triangle shaped in the embodiment, but not limited to this. The notch portion 116A1 is provided for ensuring that, when a patient holds the bite-fork 120, a connection portion described below, which connects the bite-fork 120 and a second reference member described below, and the first main body member 116A may not interfere with each other.

A plurality of first reference bodies 116B are provided in the first reference member 116. The number of the first reference bodies 116B is four in the embodiment, but not limited to this. The first reference bodies 116B are provided at four corners of the first main body member 116A, but not limited to this. The first reference bodies 116B may be, for example, characters, symbols, or designs. In the embodiment, the first reference bodies 116B are circular designs.

The first reference member 116, in more detail, the first reference bodies 116B is configured so that the positional relationship including angle relative to the upper bow 110 to be a predetermined specific relationship. In the embodiment, a hole (not illustrated) is drilled on an upper side of the notch portion 116A1 of the first main body member 116A, and by allowing the thread 111B1 attached to the bridge portion 111B of the upper-bow 110 to penetrate into the hole, the thread 111B1 is fixedly attached to the upper-bow 110. By tightening the thread 111B1, the first main body member 116A is sandwiched between the head of the thread 111B1 approaching the bridge portion 111B and the bridge portion 111B, and as a result, the first reference member 116 is attached to the upper-bow 110. If an angle to the foregoing hole penetrated by the thread 111B1 of the first reference member 116 is set at a predetermined angle at the time of performing fixation to the upper-bow 110 (for example, if an upper side of the first main body member 116A and upper side of the protector 111C are kept parallel to each other), then the positional relationship including angle of the first reference member 116 or the first reference bodies 116B to the upper-bow 110 will be always the same specific relationship.

Although the first reference member 116 is attached to the upper-bow 110 in such a manner as described above, if the first main body member 116A of the attached first reference member 116 and some kind of component of the upper-bow 110 (for example, the thread 114A1) interfere with each other, it is only necessary to appropriately take measures such as adding a proper notch like the notch portion 116A1, for example, to the first main body member 116A, in order to avoid the interference.

The bite-fork 120 is fixed to the lower face of maxillary dental arch of a patient during use of the face-bow 100. The bite-fork 120 comprises a bite-fork mainbody 121 fixed to the lower face of the maxillary dental arch of the patient. In the case of a typical face-bow, the bite-fork main body 121 comprises a connection portion 122 for establishing fixation with a lower end of a connecting member serving as a member for establishing connection between the upper-bow 110 and the bite-fork 120.

The bite-fork 120 comprising the bite-fork main body 121 and the connection portion 22 is quite general component, but a second reference member 123 that constitutes a part of the attachment in the present application is attached to the other end side of the one end side connected with the bite-fork 121 main body of the connection portion 122 of the bite-fork 120 of the embodiment.

The second reference member 123 is configured to be mostly similar to the first reference member 116. The second reference member 123 comprises a second main body member 123A composed of a transparent body. The second main body member 123A is composed of transparent resin or transparent glass. The second main body member 123A is plate-shaped, but not limited to this, and its thickness is made equal at every part thereof, but not limited to this. The second main body member 123A is rectangular as a whole, but not limited to this.

A plurality of second reference bodies 123B are provided in the second reference member 123. The number of the second reference bodies 123B is four in the embodiment, but not limited to this. The second reference bodies 123B are provided at four corners of the second main body member 123A, but not limited to this.

The second reference member 123, in more detail, is configured so that the positional relationship including angle of the second reference bodies 123B to the bite-fork 120 becomes a predetermined specific relationship. If a mutual positional relationship between the bite-fork main body 121 of the connection portion 122 and the second reference member 123 after their fixation is always constant, then this specific relationship can be achieved, and it is so configured in the embodiment, but not limited to this.

The fixation between the bite-fork main body 121 and the lower face of the maxillary dental arch is performed by a publicly known method, for example, by coating modeling compound onto the upper surface of the bite-fork main body 121, and by pressing the bite-fork main body 121 against the lower face of the maxillary dental arch.

Next, the face-bow when used at the time of recording of the mandibular motion will be described. As the face-bow in this case, for example, "CADIAX™ Compact 2 (Medical device approval number 221AGBZX00099000)" can be used which is a mandibular motion detection device imported and sold by Dental Materials & Equipment Hakusui Trading Co., Ltd.

The face-bow in this case uses the upper-bow 110 of the foregoing face-bow 100 used when the virtual articulator data is generated, and an under-bow 140 (FIG. 2) as will be described. The both are not connected to each other. The bite-fork 120 in the foregoing face-bow 100 cannot be used for this face-bow.

The under-bow 140 has a front rod 141. The front rod 141 is rod-shaped body.

A coupling member 143 comprises a hole, whose illustration is omitted, that allows the front rod 141 to pass therethrough. A hole is drilled into the coupling member 143 having a thread cut on an inner circumferential surface, and a thread 143A is threaded to the hole. While the thread 143A is loosened, the coupling member 143 can move along a lengthwise direction of the front rod 141, and can rotate with the front rod 141 as an axis. On the other hand, when the thread 143A is tightened, the tip of the thread 143A is fixed to the front rod 141, and is maintained keeping a position in the lengthwise direction of the front rod 141, and an angle relative to the front rod 141 fixed.

The coupling member 143 also comprises a pipe 143B for allowing a horizontal rod 142 to pass therethrough. The horizontal rod 142 is attached to the coupling member 143, in a state of having passed through the pipe 143B. A hole (not illustrated) is also drilled into the coupling member 143 having a thread cut on its inner circumferential surface, and a thread 143C is threaded to the hole. When the thread 143C is loosened, the horizontal rod 142 becomes able to move in the lengthwise direction of the pipe 143B, and becomes able to be rotated around its axis. When the thread 143C is tightened, the horizontal rod 142 is fixed to the pipe 143B.

As described above, since the coupling member 143 allows the position in the lengthwise direction of the front rod 141, and relative to the front rod 141 to be variable. When putting together the fact that a length from the coupling member 143 to the rear end of the horizontal rod 142 is variable, the position of the rear end of the horizontal rod 142 becomes able to be positioned freely in all of length, width, and height, when viewed from a lower bite-fork described below.

A stylus 144 is attached to the rear end of the horizontal rod 142.

The stylus 144 comes into contact with the foregoing flag 115 to be attached to the upper-bow 110, and is used to generate motion data described above. As described above, the position of the rear end of the horizontal rod 142 can be positioned freely in all of length, width, and height, when viewed from a lower bite-fork 145. By properly positioning the position of the rear end of the horizontal rod 142, positioning is performed so that the stylus 144 is located at a proper position (for example, the center of the flag 115) of the sensor portion 115A of the flag 115, when a patient is normally undergoing occlusion.

The stylus 144 includes a stylus main body 144A and a needle-like portion 144B. A cable 144A1 is connected to the stylus main body 144A. Further, from an elastic body, whose illustration is omitted, which is built in the stylus main body 144A, moderate elastic force is applied to the tip of the needle-like portion 144B. Thereby, even when a distance from the stylus main body 144A to the sensor portion 115A of the flag 115 is somewhat changed, the tip of the needle-like portion 144B gets pressed against the sensor portion 115A with a certain range of proper pressure. Further, a sensor, whose illustration is omitted, that can measure a relative position of the needle-like portion 144B in relation to the stylus main body 144A is built inside the stylus main body 144A. Thereby, in effect, the distance from the stylus main body 144A to the sensor portion 115A of the flag 115 is measured by the sensor. Data relating to the distance measured by the sensor is output from the stylus main body 144A, via the foregoing cable 144A1.

The data is synchronized with data that is output via the cable 115D from the flag 115. In the embodiment, these two combined data becomes motion data in the claimed invention representing mandibular motion of the patient. The data output from the flag 115 indicates a position of the lower jaw, along an XY-axis corresponding to vertical and horizontal on the sensor portion 115A of the flag 115, and the data output from the stylus 144 indicates a position of the lower jaw along a Z-axis perpendicular to the sensor portion 115A of the flag 115.

The stylus 144 also comprises a fourth reference member 144C. A relative positional relationship including angle between the fourth reference member 144C and the stylus main body 144A is set to be a predetermined specific relationship. The fourth reference member 144C includes two fourth reference bodies 144C1 which are spheres, and a rod-shaped body 144C2, which connects the fourth reference bodies 144C1 to the stylus main body 144A, and is rod-shaped in the embodiment, but not limited to this. The rod-shaped body 144C2 in the embodiment is arranged at a location that is linear to the stylus main body 144A, but not limited to this, and fixedly connects the two fourth reference bodies 144C1 so that the center of the two fourth reference bodies 144C1 rides on the straight line.

In the embodiment, description has been provided supposing that the first reference object 116B of the first reference member 116, and the second reference object 123B of the second reference member 123 are characters, symbols, or designs, and the third reference object 115E1 of the third reference member 115E, and the fourth reference object 144C1 of the fourth reference member 144C are spheres, but this relationship may be reversed.

The under-bow 140 comprises a lower bite-fork 145. The lower bite-fork 145 is fixed to the tip of a fixing rod 145B, of which base end is fixed to a fixing plate 145A that is fixed to the front rod 141. The lower face of the lower bite-fork 145 is fixed to the upper face of the mandibular dental arch of the patient. This fixation is performed through a general method, such as, for example, after self-curing resin or the like is disposed on the lower bite-fork 145, the lower bite-fork 145 is surface pressure-contacted with mandibular dental arch tooth buccal, thereby curing is effected in a fit state to the mandibular dental arch, and the lower bite-fork 145, which has been caused to fit to tooth buccal axial surface, is fixed with instantaneous adhesive or the like to the buccal surface of the mandibular dental arch where there is no interference with the mandibular motion.

FIG. 3 illustrates a schematic representation with the lower bite-fork 145 being attached to the mandibular dental arch of a patient. The stylus 144 and the flag 115 are arranged opposed to each other, as illustrated in FIG. 3.

To the lower bite-fork 145 is also attached the second reference member 123, which is configured similarly to the bite-fork 120. This second reference member 123 comprises the second main body member 123A and the second reference object 123B. The second reference object 123B is attached to the lower bite-fork 145, in such a manner that the positional relationship including angle between the under-bow 140 and the second reference object 123B becomes a specified relationship.

Next, the diagnosis device in the embodiment will be described. The diagnosis device is also used for treatment, but for simplicity, hereinafter simply referred to as a diagnosis device.

The diagnosis device has both functions of a virtual articulator data generation device, and a mandibular motion recording device in the claimed invention. As a matter of course, these functions can be realized as another device, however.

A diagnosis device 200 is such as the one illustrated in FIG. 4, and is composed of, in effect, a computer, for example, a general personal computer.

The diagnosis device 200 includes a main body 210 which is a computer, an input device 220, and a display 230.

The input device 220 is equipment when a dentist or the like as a user performs input to the main body 210. The input device 220 in the embodiment includes, for example, a general-purpose keyboard, a mouse and so on, but not limited to these.

The display 230 may be general-purpose one, for example, liquid crystal display, or CRT display.

Next, configuration of the main body 210 will be described.

The main body 210 comprises hardware therein as illustrated in FIG. 5. The main body 210, in the embodiment, comprises a CPU (Central Processing Unit) 211, a ROM (Read Only Memory) 212, a RAM (Random Access Memory) 213, a HDD (Hard disc drive) 214, an interface 215, and a bus 216 that connects these components.

The CPU 211 performs control of the main body 210 as a whole. The CPU 211 executes various processing as will be described below, by executing a program.

The ROM 212 stores a program for operating the CPU 211, and necessary data when controlling the main body 210 and so on.

The RAM 213 provides a work region in order for the CPU 211 to perform data processing.

The HDD 214 also records programs, data for operating the CPU 211. For example, OS (operating system) for operating the CPU 211 is recorded on the HDD 214. The program of the present invention is recorded on the ROM 212, or the HDD 214. The program of the present invention may be installed in the main body 210 from the time of shipment of the main body 210, or may be installed on the main body 210, for example, by a user, after the shipment of the main body 210. In the case of being installed after the shipment of the main body 210, the program of the present invention may be recorded on the main body 210 from a recording medium such as CD-ROM, or may be recorded on the main body 210 by way of downloading from a predetermined network such as the Internet. The program of the present invention may be the one that singly causes the CPU 211 to execute the processing described below, or may be the one that causes the CPU 211 to execute the processing described below in cooperation with OS or other programs.

The interface 215 acts as a window that connects the CPU 211, the ROM 212, the RAM 213, and the HDD 214 to the outside, and the CPU 211, the ROM 212, the RAM 213, and the HDD 214 are arranged to be able to perform data exchange with the outside via the interface 215, where necessary. The main body 210 as described below needs to be able to receive relative position image data and other image data from external equipment (for example, three-dimensional image pickup camera or two-dimensional image pickup camera), or from a recording medium that has recorded image data. The interface 215 may be arranged to receive the image data from external equipment via wired or wireless network. In order to make it possible, the interface 215 is connected to, for example, a USB terminal, whose illustration is omitted, provided in the main body 210, and is arranged to receive the image data from external equipment connected to a USB cable at one end, via the USB cable, and the USB terminal connected to the USB cable at the other end. Alternatively, the interface 215 is provided with a reader that can read data from a predetermined recording medium such as a DVD, a memory card, and is arranged to receive the image data from the recording medium that has recorded the image data loaded into the reader.

By the CPU 211 executing a program, functional blocks as illustrated in FIG. 6 are generated in the inside of the main body 210. As described above, the diagnosis device combines the functions of the virtual articulator data generation device, and the mandibular motion recording device according to the claimed invention. Accordingly, the program in the embodiment has become the state of causing, for example, general-purpose computer to act as both the virtual articulator data generation device, and the mandibular motion recording device. Indeed, in the case of causing a certain computer to act only as the virtual articulator data generation device, and causing a different computer from that to act only as the mandibular motion recording device, those skilled in the art will naturally appreciate that a program that should be installed on each of computers will suffice as long as it provides a computer with a function required for it.

In the embodiment, a reception unit 221, a control unit 222, a model generation unit 223, a position data generation unit 224, a face-bow data recording unit 225, a linking unit 226, a virtual articulator data recording unit 227, a display control unit 228, a reference position determination unit 229, and a mandibular motion image data generation unit 230 are generated within the main body 210.

In the case where a certain computer is caused to act only as the virtual articulator data generation device, the presence of the reception unit 221, the control unit 222, the model generation unit 223, the position data generation unit 224, the face-bow data recording unit 225, the linking unit 226, the virtual articulator data recording unit 227, and the display control unit 228 within the main body 210 of the computer will suffice.

Further, in the case where a certain computer is caused to act only as the mandibular motion recording device, the presence of the reception unit 221, the control unit 222, the virtual articulator data recording unit 227, the display control unit 228, the reference position determination unit 229, and the mandibular motion image data generation unit 230, within the main body 210 of the computer will suffice.

The reception unit 221 is used to receive data input from the outside via the interface 215. The reception unit 221 serves concurrently as a reception means, a second reception means, and a third reception means according to the present application.

The data received by the reception unit 221 includes, for example, the below-described data received from the input device 220, or image data received from external equipment or a recording medium. The image data received by the reception unit 221 includes maxillary dental arch image data which is data of a maxillary dental arch image defined as an image of a maxillary dental arch of a patient, mandibular dental arch image data which is data of a mandibular dental arch image defined as an image of a mandibular dental arch of a patient; upper-part image data which is data of upper-part images defined as images representing the relative positional relationship including angle between the bite-fork 120 and the lower face of the maxillary dental arch, projected keeping the bite-fork 120 fixed to the maxillary dental arch of the patient; relative position image data which is data of relative position images defined as images in which the upper-bow 110 and the bite-fork 120 are collectively reflected, and images representing the relative positional relationship including angle between the upper-bow 110 and the bite-fork 120; occlusal image data being data of occlusal images defined as images representing an occlusal state of the maxillary dental arch and the mandibular dental arch; and reference image data which is data of a reference image defined as an image by which a position of the lower jaw of the patient in a reference position can be identified. The reference image data is used, when the diagnosis device 200 acts as the mandibular movement recording device, and other image data is used when the diagnosis device 200 acts as the virtual articulator data generation device.

The reception unit 221 receives motion data via the interface 215, from the flag 115 and the stylus 144. The motion data is used, when the diagnosis device 200 acts as the mandibular movement recording device.

The reception unit 221 discriminates which data is the received data, and sends it to an appropriate sending destination.

The reception unit 221 is configured to send the data received from the input device 220, mainly to the control unit 222, and send the maxillary dental arch image data and the mandibular dental arch image data to the model generation unit 223, and send the upper-part image data, relative position image data, and the occlusal image data to the position data generation unit 224.

The reception unit 221 is also configured to send the reference image data to the reference position determination unit 229, and to send the motion data to the mandibular motion image data generation unit 230. However, the reception unit 221 is configured to send the motion data to the reference position determination unit 229, only when the reference position determination unit 230 determines a reference position.

The control unit 222 performs control of the entire main body 210.

The model generation unit 223 is configured to receive the maxillary dental arch image data, and the mandibular dental arch image data from the reception unit 221, as described above. The model generation unit 223 is configured to generate the maxillary dental arch model data which is data of the maxillary dental arch model defined as a three-dimensional model of the maxillary dental arch from the received maxillary dental arch image data. If it is a real articulator, this corresponds to the model of the maxillary dental arch. The model generation unit 223 is configured to generate the mandibular dental arch model data which is data of the mandibular dental arch model defined as a three-dimensional model of the mandibular dental arch from the received mandibular dental arch image data. If it is a real articulator, this corresponds to the model of the mandibular dental arch. The model generation unit 223 generates the maxillary dental arch model data and the mandibular dental arch model data, for example, by applying a known image processing technique using a polygon.

In order for the model generation unit 223 to be able to precisely generate the maxillary dental arch model and the mandibular dental arch model, it is preferable that the maxillary dental arch image and the mandibular dental arch image are respectively three-dimensional images, but not necessarily limited to this. A three-dimensional image pickup camera for oral cavity image pickup capable of performing such an image pickup is also in practical use.

The model generation unit 223 is configured to send the generated maxillary dental arch model data, and the mandibular dental arch, to the linking unit 226.

The position data generation unit 224 is configured, as described above, to receive the upper-part image data, the relative position image data, the occlusal image data, from the reception unit 221.

The position data generation unit 224 is configured to obtain the relative position of the maxillary dental arch including angle in relation to the reference surface in the living patient, from the received upper-part image data, and the relative position image data, and generate the first position data which is data about the position of the maxillary dental arch relative to a virtual reference surface which is a phantom reference surface. The position data generation unit 224 is also configured to obtain a relative position of the mandibular dental arch including angle in relation to the maxillary dental arch, from the received occlusal image data, and to generate the second position data which is data about a position of the mandibular dental arch relative to the maxillary dental arch.

The first position data and the second position data are used, when an alignment between the maxillary dental arch model and the mandibular dental arch model in the virtual articulator to be created on a computer is performed later. If the first position data is used, an alignment between the reference surface and the maxillary dental arch model can be performed, so as to coincide with the reference surface and the maxillary dental arch in a living patient. If the second position data is used, the alignment between the maxillary dental arch model and the mandibular dental arch model can be performed, so as to coincide with the maxillary dental arch and the mandibular dental arch in a living patient.

The position data generation unit 224 in the embodiment is configured to generate the first position data in the following manner. In order to identify a position (coordinates) of a certain object from an image, publicly known or well-known so-called camera calibration processing may be used.

As described above, the first position data is generated from the upper-part image data, and the relative position image data. The upper-part image data, as described above, is images representing the relative positional relationship including angle between the bite-fork 120 and the maxillary dental arch lower face. Partly because of a plurality of images, since the bite-fork 120 and the maxillary dental arch are projected in the upper-part images, it is easy to generate data representing a mutual positional relationship by applying a publicly-known image processing to the upper-part image data. For example, by superposing the maxillary dental arch image in which only the maxillary dental arch is projected, and the upper-part images in which the maxillary dental arch and the bite-fork 120 are projected, the positional relationship between the maxillary dental arch and the bite-fork 120 is easily obtained. In order to determine more precisely such a positional relationship, the upper-part images are preferably three-dimensional images.

In order to obtain the first position data, also from relative position image data, it is necessary to obtain the relative positional relationship including angle between the upper-bow 110 and the bite-fork 120. In the relative position images of the embodiment, the upper-bow 110 and the bite-fork 120 are projected, as described above. It is possible to obtain the relative positional relationship between the upper-bow 110 and the bite-fork 120, from image processing on the relative position images in which at least a portion of these is reflected. The diagnosis device 200 of the embodiment has information about, for example, sizes, shapes of the upper-bow 110 and the bite-fork 120, in the face-bow data recording unit 225. If the information is used, the relative positional relationship between the upper-bow 110 and the bite-fork 120 can be obtained by performing a publicly-known image processing on the images of the upper-bow 110 and the bite-fork 120 projected in the relative position images.

Indeed in the embodiment, in the relative position images, in addition to at least a portion of the upper-bow 110 and the bite-fork 120, there are photographed the first reference object 116B of which the positional relationship including angle relative to the upper-bow 110 is set at a predetermined specific relationship, and the second reference object 123B of which positional relationship including angle relative to the bite-fork 120 is set at a predetermined specific relationship. Then, the face-bow data recording unit 225 of the diagnosis device 200 of the embodiment has information about sizes, shapes of a plurality of the first reference bodies 116B, and information about the mutual positional relationship therebetween, as well as information about sizes, shapes of a plurality of the second reference bodies 123B, and information about the mutual positional relationship therebetween. By performing image processing on the relative position images by using the information, the position data generation unit 224 can obtain the relative positional relationship including angle between the plurality of first reference bodies 116B, and the plurality of second reference bodies 123B. Further, the face-bow data recording unit 225 of the diagnosis device 200 of the embodiment has in advance, information about a positional relationship between the upper-bow 110 and the first reference bodies 116B, and information about a positional relationship between the bite-fork 120 and the second reference bodies 123B. The position data generation unit 224 of the embodiment can obtain precisely and simply the relative positional relationship including angle between the upper-bow 110 which is in a specific relationship to the first reference bodies 116B, and the bite-fork 120 which is in a specific relationship to the second reference bodies 123B, by using the information.

The relative position images may be two or more sheets of images projected from different directions, when the relative position images are two-dimensional images. When the relative position images are two or more sheets of two-dimensional images projected from different directions, it is preferable that these images are simultaneously projected, or projected so that there is no movement in a patient while two or more sheets of images are being projected. Further, the relative position images, in the case where the relative position images are three-dimensional images, may be one or more sheets of images. If the relative position images are such images, it is easy to obtain the relative positional relationship between the upper-bow 110 and the bite-fork 120, from the relative position images, by a publicly-known method.

On the face-bow data recording unit 225, the foregoing information or data thereof are recorded. Then, the face-bow 100 combined with the diagnosis device 200 of the embodiment may come in plural kinds. In that case, on the face-bow data recording unit 225, face-bow data may be recorded by the same number as the number of kinds of the face-bow 100. The face-bow data is respective data about a plurality of the face-bows 100 used in combination with the diagnosis device 200. In the case where there is a plurality of the face-bows 100 used in combination with the diagnosis device 200, a person who operates the diagnosis device 200 is allowed to select face-bow data about the face-bow 100 to be used, from among a plurality of pieces of the face-bow data, by operating, for example, the input device 220. The position data generation unit 224 is configured so that the relative positional relationship between the upper-bow 110 and the bite-fork 120 can be reliably obtained, by using the face-bow data thus selected. The above circumstances are the same even in the case where there are plural kinds of the first reference bodies 116B, and the second reference bodies 123B. In the case where plural kinds of the first reference bodies 116B and the second reference bodies 123B are used, already mentioned information relating to these bodies will be prepared in plural sets. By doing as mentioned above, the relative positional relationship between the bite-fork 120 and the maxillary dental arch, and the relative positional relationship between the upper-bow 110 and the bite-fork 120 can be obtained. Then, because the upper-bow 110 is uniquely fixed to the reference surface assumed on the patient's head, the fact that the relative positional relationship between the upper-bow 110 and the bite-fork 120 can be grasped means that, in effect, the relative positional relationship between the reference surface and the bite-fork 120 can be grasped. Then, as described above, because the relative positional relationship between the bite-fork 120 and the maxillary dental arch has also been grasped, by combining this relative positional relationship and the relative positional relationship of the bite-fork 120 to the reference surface, the positional relationship of the maxillary dental arch to the reference surface can be grasped.

The positional relationship between the patient's reference surface thus obtained and the maxillary dental arch will be used as the first position data which is data about the mutual positions between the virtual reference surface and the maxillary dental arch model, for reproducing as the positional relationship between virtual reference surface which is virtual reference surface in the virtual articulator formed on a computer, and the maxillary dental arch model.

The position data generation unit 224 in the embodiment is configured to generate second position data, as shown below.

As described above, the second position data is generated from occlusal image data. The occlusal image data corresponds to images representing an occlusal state of the maxillary dental arch and the mandibular dental arch, as described above. Partly because there are plural images, the maxillary dental arch and the mandibular dental arch (or a portion of these in some cases) in the occlusal state are reflected in the occlusal images, or printing paste is reflected in the occlusal images. The printing paste can print shapes of the maxillary dental arch and the mandibular dental arch, in the occlusal state between the maxillary dental arch and the mandibular dental arch of the patient. As a result, it is easy to generate the second position data representing the mutual positional relationship between the maxillary dental arch and the mandibular dental arch, by applying the publicly-known image processing to the occlusal image data.

The position data generation unit 224 sends the first position data and the second position data generated as stated above to the linking unit 226.

The linking unit 226 receives the maxillary dental arch model data and the mandibular dental arch model data, from the model generation unit 223. The linking unit 226 also receives the first position data and the second position data, from the position data generation unit 224.

The linking unit 226 generates the virtual articulator data about the virtual articulator, by using these data. The virtual articulator is the one obtained by stereographically imaging an actual articulator. In the virtual articulator, the physical models of the maxillary dental arch and the mandibular dental arch in the actual articulator are replaced by the virtual maxillary dental arch model and the virtual mandibular dental arch model.

Then, an alignment of the maxillary dental arch relative to the reference surface in the actual articulator is executed as an alignment of the maxillary dental arch model relative to the virtual reference surface in the virtual articulator. The first position data which is data about the mutual positions of the virtual reference surface and the virtual maxillary dental arch model there is used for the alignment.

Further, an alignment between the lower face of the maxillary dental arch and the upper face of the mandibular dental arch in the actual articulator is executed as an alignment between the lower face of the virtual maxillary dental arch model and the upper face of the virtual mandibular dental arch model in the virtual articulator. The second position data representing the mutual positional relationship between the maxillary dental arch and the mandibular dental arch is used for the alignment.

Consequently, the virtual articulator data about the virtual articulator is generated. The virtual articulator is configured to enable the virtual maxillary dental arch model and the virtual mandibular dental arch model to be opened and closed, for example with virtual jaw joints as an axis. Such image processing is possible, when the publicly-known technique is used.

The linking unit 226 sends the virtual articulator data to the virtual articulator data recording unit 227 and the display control unit 228.

The virtual articulator data recording unit 227 is used to record the virtual articulator data. The virtual articulator data is generally recorded on the virtual articulator data recording unit 227, together with data for identifying to which patient the virtual articulator belongs.

The display control unit 228 performs control of the display 230. Upon receiving the virtual articulator data, the display control unit 228 creates, for example, image data of moving images for displaying the virtual articulator on the display 230 based thereon, and sends the image data to the display 230 via the interface 215.

Thereby, the images of the virtual articulator will be displayed on the display 230 by moving images, for example.

The reference position determination unit 229 receives the reference image data, from the reception unit 221 as described above, and determines a reference position of the patient's lower jaw, based thereon, and in its turn, a reference position of the lower jaw (or the mandibular dental arch) in the virtual articulator.

This is performed as below. The reference position determination unit 229 continues to receive motion data representing a position of the patient's lower jaw, until the reference position determination unit 229 determines the reference position. The reference image is projected that is for example a three-dimensional image, in which the patient is reflected, at a given moment. The reference position determination unit 229 makes adjustment so that the position of the lower jaw indicated by the motion data at that moment coincides with the reference image, and motion data that is just data of a relative movement amount of the stylus 144 relative to the flag 115 (this means that the track of movement from a predetermined point can be followed even only by the motion data, but a location where the predetermined point is situated is not defined only by the motion data), is converted into data of the relative position in relation to the reference surface. Thereby, the reference position which is an initial position or a reference position for causing the lower jaw to perform mandibular motion on the virtual articulator is determined.

The reference image may be, for example, an image that enables the relative position of the lower jaw (or the mandibular dental arch) in relation to the patient's head or the reference surface to be grasped.

The reference images may be, for example, combination of images in which the mandibular dental arch and the maxillary dental arch of the patient are reflected, and images in which the patient's mandibular dental arch and the patient's head attaching the upper-bow 110 are reflected. In the case of the embodiment, the reference images may be a combination of images in which the mandibular dental arch and the maxillary dental arch of the patient are reflected, and images in which the relative positional relationship including angle between the upper-bow 110 and the under-bow 140 can be identified. These images, similarly to the case of the relative position image, may be two-dimensional images picked up from two or more different angles, or may be three-dimensional images. In the case where these images are two or more sheets of two-dimensional images picked up from different directions, it is preferable that these images are simultaneously picked up, or picked up so that there is no movement in the patient while two or more sheets of images are picked up.

In the images in which the relative positional relationship including angle between the upper-bow 110 and the under-bow 140 in the embodiment can be identified, the upper-bow 110 and the under-bow 140 are reflected. The relative positional relationship between the upper-bow 110 and the under-bow 140 can be determined by the reference position determination unit 229 from the reference images, in the same way as the position data generation unit 224 that has determined the relative positional relationship between the upper-bow 110 and the bite-fork 120 from the relative position images.

In the upper-bow 110 and the under-bow 140 in the embodiment, as described above, the first reference member 116 and the second reference member 123 are provided, respectively. If these members are used, the relative positional relationship between the flag 115 and the stylus 144 is determined, in the same way as the relative positional relationship between the upper-bow 110 and the bite-fork 120 which has been determined from the relative position images. Further, in the flag 115 and the stylus 144 in the embodiment, as described above, the third reference member 115E and the fourth reference member 144C are provided, respectively. The third reference members 115E and the fourth reference members 144C can be utilized for determining the relative positional relationship between the flag 115 and the stylus 144 from the reference images, in a method similar to that used to utilize the first reference bodies 116B and the second reference bodies 123B, when the relative positional relationship between the upper-bow 110 and the bite-fork 120 is determined from the relative position images. In other words, if the relative positional relationship between the third reference object 115E1 of the third reference member 115E and the fourth reference object 144C1 of the fourth reference member 144C can be determined, then the relative positional relationship between the flag 115 which is in a predetermined positional relationship relative to the third reference member 115E, and the stylus 144 which is in a predetermined positional relationship relative to the fourth reference member 144C will be able to be determined. Then, if this is determined, the positional relationship including angle between the upper-bow 110 and the lower bite-fork 145 is also determined.

Information on the predetermined positional relationship between the first reference member 116 and the upper-bow 110, or between the third reference member 115E and the flag 115, and information on the predetermined positional relationship between the second reference member 123 and the under-bow 140, or between the fourth reference member 144C and the stylus 144, necessary for determining the relative positional relationship between the flag 115 and the stylus 144, may be recorded on, for example, the face-bow data recording unit 225, or retained by the reference position determination unit 229. In the embodiment, the reference position determination unit 229 retains these pieces of information, and the reference position determination unit 229 is configured to be able to determine the relative positional relationship including angle between the upper-bow 110 and the lower bite-fork 145, from the reference images, by using the information. Thus, in the embodiment, by combination of the first reference member 116 and the second reference member 123, or by combination of the third reference member 115E and the fourth reference member 144C, the relative positional relationship between the upper-bow 110 and the lower bite-fork 145 is made detectable. However, as long as only one of these combinations exists, it is possible to detect the relative positional relationship between the upper-bow 110 and the lower bite-fork 145.

When the relative positional relationship between the upper-bow 110 and the lower bite-fork 145 is detected by combination of the third reference member 115E and the fourth reference member 144C, the reference position determination unit 229 may be configured to determine the relative positional relationship including angle between the upper-bow 110 and the lower bite-fork 145, for example, as shown below. First, an extension line, on which the both styluses 144 are overlapped each other, is generated between faces opposing to each other of the two flags 115, within a virtual three-dimensional space, and contact points between the line and faces opposing to each other of the flags 115 are obtained as a point P, and a point Q, and then a point R which is a middle point of the point P and the point Q is obtained. Further, in parallel to such processing, a position of the positioning rod 113 is obtained as a point S (FIG. 7). FIG. 7 is intended to illustrate another example of the first reference member 116 provided in the upper-bow 110 and a fourth reference member 144C provided in the stylus 144. The first reference member 116 of this example is small, and is attached on a forwardmost side of the positioning rod 113, and the second reference member 144C is configured so that fourth reference bodies 144C4 are drawn on a transparent plate 144C3, similar to the first reference member 116

Next, the reference position determination unit 229 determines a line passing through the point P and the point Q, as a Y-axis. Also, the reference position determination unit 229 renders within virtual three-dimensional space, a triangle connecting the point P, the point Q, and the point S, and renders within virtual three-dimensional space, a line passing through a plane including the triangle connecting the point P, the point Q, and the point S, as well as passing through the point R, and orthogonal to the Y-axis, which is assumed to be an X-axis. Next, a line orthogonal to both the foregoing X-axis and the Y-axis is rendered within virtual three-dimensional space, which is assumed to be a Z-axis. In this manner, by using the X-axis, the Y-axis, and the Z-axis thus obtained, if the relative positional relationship including angle between the stylus 144 and the flag 115 is obtained, it is easy to obtain the relative positional relationship including angle between the upper-bow 110 and the lower bite-fork 145. Also when the relative positional relationship including angle between the upper-bow 110 and the lower bite-fork 120 is obtained, the similar way of obtaining coordinate axis can be adopted.

The reference position determination unit 229 is configured to send the reference position data which is data on the reference position determined as shown above, to the mandibular motion image data generation unit 230.

The mandibular motion image data generation unit 230 receives the motion data from the reception unit 221, as described above. The motion data is sent from the flag 115, and the stylus 144 of the face-bow 100 that comprises the under-bow 140 used when recording of the mandibular motion is performed, and is data representing movement amounts from the predetermined points in directions of XYZ-axes of the lower jaw, as described above.

The flag 115 is fixed to the upper-bow 110 to be fixed to the patient's head. The stylus 144 is fixed to the under-bow 140 fixed by the lower bite-fork 145 to the mandibular dental arch which is a part of the lower jaw of the patient. Then, the upper-bow 110 and the under-bow 140 are not connected to each other. When the patient performs mandibular motion, the entire under-bow 140 moves following a mandibular motion, and following the mandibular motion, the needle-like portion 144B of the stylus 144 traces the sensor portion 115A of the flag 115. Thereby, the foregoing motion data becomes data representing the mandibular motion.

The mandibular motion image data generation unit 230 receives the motion data, and receives the reference position data from the reference position determination unit 229, and reads out the virtual articulator data from the virtual articulator data recording unit 227.

Then, the mandibular motion image data generation unit 230, after determining the reference position of the lower jaw in the virtual articulator according to the reference position data, on images in the virtual articulator identified according to the virtual articulator data, executes processing for writing marks representing the mandibular motion of the patient, or after determining the reference position of the lower jaw in the virtual articulator according to the reference position data, executes processing for making the lower jaw on images in the virtual articulator to perform mandibular motion through animation so that the mandibular motion of the patient is reproduced, generates the mandibular motion image data which is data generated as the result of these processing.

The mandibular motion data generation unit 230 is configured to send the generated mandibular motion image data to the virtual articulator data recording unit 227 and the display control unit 228.

In the embodiment, the virtual articulator data recording unit 227 is configured to record the mandibular motion image data, in addition to the virtual articulator data. Further, in the embodiment, the display control unit 228 is configured to display on the display 230, not only the foregoing images of the virtual articulator, but also images of the virtual articulator in which marks representing the mandibular motion of the patient are written, based on the mandibular motion image data, or images of moving images for making the lower jaw on the image of the virtual articulator to perform mandibular motion so that the mandibular motion of the patient is reproduced.

Next, a method for performing diagnosis by the foregoing diagnosis device will be described. The diagnosis device can perform generation of the virtual articulator data, and recording of the mandibular motion. These will be described in order.

Upon generation of the virtual articulator data, first, the maxillary dental arch images of the patient, and the mandibular dental arch image, occlusal images are picked up, and the maxillary dental arch image data, and the mandibular dental arch image data, and the articulation image data are generated. This process may be performed at any time, if the face-bow 100 is not in the fixed state to the patient.

As described above, the maxillary dental arch images are, for example, three-dimensional images in which the maxillary dental arch is projected, and are made to be sufficient to generate the maxillary dental arch model later, and are made to be plural images depending on the situation.

The mandibular dental arch images are, for example, three-dimensional images in which the mandibular dental arch is projected, and are made to be sufficient to generate the mandibular dental arch model later, and are made to be plural images depending on the situation.

The occlusal images are images in which the relative position of the mandibular dental arch including angle in relation to the maxillary dental arch can be grasped, and are made to be sufficient to generate later the second position data about the relative position of the mandibular dental arch in relation to the maxillary dental arch, and are made to be plural images depending on the situation. In the occlusal images, there is reflected the occlusion of the maxillary dental arch and the mandibular dental arch (a part of these in some cases), or printing paste that can print the shapes of the maxillary dental arch and the mandibular dental arch, occluded between the maxillary dental arch and the mandibular dental arch of the patient.

Next, the face-bow 100 is attached to the patient's head. The way how to attach the face-bow 100 to the patient's head is no different from the case of general face-bow 100.

If the embodiment is applied, the upper-bow 110 is set to the state in which two temples 114 lie on the patient's ears, the bridge portion 111B lies on the patient's nose bridge, the frame portion 111A of the main body portion 111 is properly positioned in front of the face of the patient, and the vertical portion 113B of the positioning rod 113 is properly positioned on the patient's nose. For this reason, performing adjustment of positions of the temples 114 and the positioning rod 113 relative to the main body portion 111, or positions of the back temple portions 114B relative to the front temple portions 114A of the temples 114, according to the dimension of the patient's face is similar to the case of general face-bow. By doing so, the upper-bow 110 is uniquely positioned in a predetermined positional relationship relative to the reference surface the patient's head. At this time, the flag 115 needs not be attached to the temples 114.

On the other hand, for example, modeling compound is coated on the upper face of the bite-fork 120, and the upper face of the bite-fork 120 is fixed to the lower face of the maxillary dental arch of the patient.

When the face-bow 100 has been attached to the patient in a manner as shown above, the upper-part images, and relative position images are photographed, and the upper-part image data and relative position image data are generated.

The upper-part images, in order to be able to grasp the relative positional relationship also including angle between the maxillary dental arch and the bite-fork 120, are three-dimensional images, for example, in which these (at least a part of these) are projected, and are made to be sufficient to generates the first position data together with the relative position images later, and are made to be plural images depending on the situation.

The relative position images should be the ones from which the relative positional relationship including angle between the upper-bow 110 and the bite-fork 120 can be grasped. The relative position images are, for example, two or more sheets of images projected from different angles, or one or more sheets of three-dimensional images. At least a part of the upper-bow 110 and the bite-fork 120 is reflected in the relative position images, but in the embodiment, the first reference bodies 116B and the second reference bodies 123B are reflected, in addition to it.

Next, processing for generating the virtual articulator data is executed by the diagnosis device 200.

First, information such as names of patients for identifying patients is input from the input device 220. The information that has been input from the input device 220 is sent from the interface 215 to the control unit 222.

The control unit 222 records the information on the virtual articulator data recording unit 227, as information for identifying patients whose virtual articulator data is going to be created from now.

Next, data of various images is input into the diagnosis device 200.

Specifically, the maxillary dental arch image data which is data of the maxillary dental arch image, and the mandibular dental arch image data which is data of the mandibular dental arch image, and the occlusal image data of the occlusal images, the upper-part image data which is data of the upper-part images, and the relative position image data which is data of the relative position images are input. These data is input from external equipment, or via a predetermined recording media, and in any way, is received by the reception unit 221 via the interface 215.

The input of data of these images is not necessarily performed at one time, or successively. For example, each time these data is generated, these data may be input into the reception unit 221.

The reception unit 221 sends the maxillary dental arch image data, and the mandibular dental arch image data, to the model generation unit 223, and sends the upper-part image data, and the relative position image data, and the occlusal image data to the position data generation unit 224.

The model generation unit 223, which has received the maxillary dental arch image data, and the mandibular dental arch image data from the reception unit 221, generates maxillary dental arch model data which is data of the maxillary dental arch model defined as a three-dimensional model of the maxillary dental arch from the maxillary dental arch image data, and generates the mandibular dental arch model data which is data of the mandibular dental arch model defined as a three-dimensional model of the mandibular dental arch from the mandibular dental arch image data.

The model generation unit 223 sends the generated maxillary dental arch model data and the mandibular dental arch model data, to the linking unit 226.

The position data generation unit 224, which has received the upper-part image data, posture image data, and the occlusal image data from the reception unit 221, is configured to generate the first position data from the upper-part image data and the relative position image data, and generates the second position data from the occlusal image data.

As described above, in the embodiment, when the first position data is created, the data recorded on the face-bow data recording unit 225 is used. When there is a plurality of data about the face-bow recorded on the face-bow data recording unit 225, the data about the face-bow that was used by the patient is selected from among the plurality of data, and subsequently the data about the face-bow will be read by the position data generation unit 224. Information for identifying the face-bow that was used by patient, which is necessary for the selection, is sent to the control unit 222 via the interface 215, from the input device 220 operated by a dentist, for example, and then conveyed from the control unit 222 to the position data generation unit 224. The position data generation unit 224 is configured to be able to select data about the face-bow that should be read out based on the information, from among the plurality of data.

The position data generation unit 224 sends the first position data and the second position data generated by a method already mentioned, to the linking unit 226.

The linking unit 226, which has received the maxillary dental arch model data and the mandibular dental arch model data from the model generation unit 223, and has received the first position data and the second position data from the position data generation unit 224, generates virtual articulator data about the virtual articulator, based on these data. Indeed, the virtual articulator made by these data is similar to semi-adjustable articulator as called in articulators, and is such as the one that performs mandibular motion relative to joint positions of general humans.

The linking unit 226 sends the virtual articulator data to the virtual articulator data recording unit 227 and the display control unit 228.

The virtual articulator data recording unit 227 records the virtual articulator data sent from the linking unit 226. Basically, the virtual articulator data is recorded on the virtual articulator data recording unit 227, along with information for identifying a patient who was the target for generation of the virtual articulator data previously recorded on the virtual articulator data recording unit 227. Upon receiving the virtual articulator data from the linking unit 226, the display control unit 228 creates for example, image data of moving images for displaying the virtual articulator on the display 230 based thereon, and sends the image data to the display 230 via the interface 215.

Thereby, the images of the virtual articulator are displayed by for example moving images, on the display 230.

Next, recording of the mandibular motion will be described below.

When recording the mandibular motion, the under-bow 140, in more detail, the lower bite-fork 145 of the under-bow 140 is fixed to the mandibular dental arch of the patient.

Then, adjustment of the coupling member 143, the horizontal rod 142 and the like is performed, so that the relative positional relationship of the stylus 144 to the flag 115 becomes a proper relationship relative to a margin of a degree. For example, the foregoing adjustment is performed so that the needle-like portion 144B of the stylus 144 comes into contact with approximately the center of the sensor portion 115A of the flag 115 with a suitable pressure, when the patient causes the maxillary dental arch and the mandibular dental arch to naturally fit together (bite).

Next, projection of the reference images is performed, and the reference image data about the reference images is generated. As described above, the reference images are images for enabling the positional relationship between the maxillary dental arch and the mandibular dental arch relative to the reference surface to be grasped, and as described above, in the embodiment, are images in which the upper-bow 110 and the under-bow 140 are reflected.

Next, the reference image data is sent to the diagnosis device 200. The reference image data is received by the reception unit 221, and is sent to the reference position determination unit 229.

The reference position determination unit 229 determines reference position of the lower jaw on the image of the virtual articulator, from the reference image data, and the motion data. The reference position data representing the reference position is sent to the mandibular motion image data generation unit 230, from the reference position determination unit 229.

The mandibular motion image data generation unit 230 receives the motion data from the reception unit 221 as described above, and receives the reference position data from the reference position determination unit 229.

The mandibular motion image data generation unit 230 determines the reference position of the lower jaw on the image of the virtual articulator, according to the reference position data, and subsequently, executes processing for writing marks representing the mandibular motion of the patient, on the image of the virtual articulator identified according to the virtual articulator data read from the virtual articulator data recording unit 227, or executes processing for causing the lower jaw on the image of the virtual articulator to perform mandibular motion, so that the mandibular motion of the patient be reproduced by animation, and generates the mandibular motion image data which is data generated as the results of these processing.

The mandibular motion images reproduced according to these mandibular motion image data will reproduce a position or movement of unique joint to each patient, and relative movements between the maxillary dental arch and the mandibular dental arch on the virtual articulator represented thereby would be as if the virtual articulator were a full-adjustable articulator.

The mandibular motion image data generation unit 230 sends the generated mandibular motion image data to the virtual articulator data recording unit 227 and the display control unit 228.

On the virtual articulator data recording unit 227, the mandibular motion image data is recorded, in addition to the virtual articulator data. Preferably, the virtual articulator data and the mandibular motion image data of the same patients are recorded on the virtual articulator data recording unit 227 in correspondence with each other.

Further, the display control unit 228 displays on the display 230, the image of the virtual articulator in which marks indicating the mandibular motion of the patient are written, according to the mandibular motion image data, or images of moving image for causing the lower jaw on the image of the virtual articulator, to perform mandibular motion so as to reproduce the mandibular motion of the patient. Thereby, a dentist can grasp intuitively and precisely the mandibular motion of the patient.

Modified Example

This modified example differs from the case of the foregoing embodiment in the way how to record the mandibular motion.

Specifically, a part of configuration of the face-bow used for recording of the mandibular motion, and a part of configuration, operation of the diagnosis device 200 are different from the case of the foregoing embodiment.

In the foregoing embodiment, the flag 115 and the stylus 144 reflect the mandibular motion of the patient, and are configured to be able to output motion data which is data relating to the relative positional relationship therebetween.

However, the flag 115 and the stylus 144 may be the ones that do not output the motion data. For example, the flag 115 may not comprise the sensor portion 115A that can output data.

In the case of recording the mandibular motion by using the face-bow comprising the flag 115 and the stylus 144 that are not configured to output such motion data, data corresponding to the motion data that was output from the flag 115 and the stylus 144 must be managed to be generated, in the foregoing embodiment.

In this modified example, this will be performed by image processing. By using a camera capable of picking up three-dimensional images, or a camera capable of picking up two or more two-dimensional images, the flag 115 and the stylus 144, which are for example a combination of simple plate and rod that cannot output electrical motion data, are picked up by moving images while the patient is performing mandibular motion. If image processing such as already mentioned is performed on the moving images, the relative positional relationship between the flag 115 and the stylus 144 can be detected, then the data representative of the relative positional relationship between the flag 115 and the stylus 144 becomes data that corresponds to the motion data in the foregoing embodiment. The moving images necessary for generating data that corresponds to such motion data are herein referred to as motion image. If the above third reference member 115E and the fourth reference member 114C are reflected on the motion image, then it is easy to obtain the relative positional relationship between the flag 115 and the stylus 144 from the motion images. Then, the data corresponding to thus generated motion data is used similarly to the case of the embodiment describe above.

In the foregoing embodiment, the reception unit 221 was configured to receive the motion data, but the reception unit 221 in the modified example does not receive the motion data, and receives moving image data of the foregoing moving images of the mandibular motion from a camera. Then, in the modified example, for example, the reference position determination unit 229 (of course, a new function block having a function of generating the foregoing data corresponding to the motion data may exist), is configured to generate the foregoing data that corresponds to the motion data, in addition to the foregoing function of determining the reference position.

According to a recording method of the mandibular motion based on the modified example, the flag 115 and the stylus 144 having complex functions become unnecessary.

DESCRIPTION OF SIGN

100: face-bow
110: upper-bow
111: main body portion
111A: frame portion
111B: bridge portion
111B1: thread
111C: protector
111C1: long hole
111D: mounting portion
111E: thread
112: supporting block
112A: thread
113: positioning rod
113A: horizontal portion
113B: vertical portion
114: temple
114A: front temple portion
114B: back temple portion
114A1: thread
115: flag
115A: sensor portion
115B: frame
115C: thread
115D: cable
115E: third reference member
115E1: third reference object
116: first reference member
116B: first reference object
120: bite-fork
121: bite-fork main body
122: connection portion
123: second reference member
123B: second reference object
140: under-bow
141: front rod
142: horizontal rod
143: coupling member
143A: thread
143B: pipe
143C: thread
144: stylus
144A: stylus main body
144B: needle-like portion
144C1: fourth reference object
145: lower bite-fork
145A: fixing plate
200: diagnosis device
220: input device
230: display
211: CPU
212: ROM
213: RAM
214: HDD
215: interface
216: bus
221: reception unit
222: control unit
223: model generation unit
224: position data generation unit
225: face-bow data recording unit
226: linking unit
227: virtual articulator data recording unit
228: display control unit
229: reference position determination unit
230: mandibular motion image data generation unit

The invention claimed is:

1. A virtual articulator data generation device capable of generating virtual articulator data which is data of a virtual articulator, by using images of a face-bow comprising an upper-bow fixedly securable to a cranium of a patient, keeping the relative positional relationship including angle in relation to a predetermined reference surface in the cranium of the patient uniquely determined, and a bite-fork fixedly securable to an lower face of a maxillary dental arch of the patient by coating curable substance, which are precisely mounted on the patient, the virtual articulator data generation device comprising:

a reception means for receiving maxillary dental arch image data which is data of a maxillary dental arch image defined as an image of a maxillary dental arch, mandibular dental arch image data which is data of a mandibular dental arch image defined as an image of a mandibular dental arch, upper-part image data which is data of an upper-part image defined as an image representative of the relative positional relationship including angle between the bite-fork and a lower face of the maxillary dental arch, relative position image data which is data of relative position images defined as images, in which the upper-bow and the bite-fork are collectively reflected, and representative of the relative positional relationship including angle between the upper-bow and the bite-fork, and occlusal image data which is data of occlusal images defined as images representative of a bite state of the maxillary dental arch and the mandibular dental arch; a model generation means for generating maxillary dental arch model data which is data of a maxillary dental arch model defined as a three-dimensional model of the maxillary dental arch from the maxillary dental arch image data received from the reception means, as well as generating mandibular dental arch model data which is data of a mandibular dental arch model defined as a three-dimensional model of the mandibular dental arch from the mandibular dental arch image data received from the reception means; a position data generation means for obtaining a relative position of the maxillary dental arch including angle in relation to the reference surface in a living patient, from the upper-part image data, and the relative position image data received from the reception means, generating first position data which is data about a position of the maxillary dental arch model relative to a virtual reference surface which is a phantom reference surface, as well as obtaining a relative position of the mandibular dental arch including angle in relation to the maxillary dental arch from occlusal image data received from the reception means, generating second position data which is data about a position of the mandibular dental arch model relative to the maxillary dental arch model; and a linking means for receiving the maxillary dental arch model data, and the mandibular dental arch model data from the model generation means, as well as receiving the first position data, and the second position data from the position data generation means, and generating the virtual articulator data, so that the relative positional relationship between the maxillary dental arch and the mandibular dental arch relative to the reference surface in the living patient is reproduced in the positional relationship between the maxillary dental arch model and the mandibular dental arch model relative to the virtual reference surface by using the first position data, and the second position data.

2. The virtual articulator data generation device according to claim 1, wherein the occlusal images are images in which occlusion part between the maxillary dental arch and the mandibular dental arch of a patient are projected.

3. The virtual articulator data generation device according to claim 1, wherein the occlusal images are images of printing paste that can print shapes of the maxillary dental arch and the mandibular dental arch, occluded between the maxillary dental arch and the mandibular dental arch of a patient.

4. The virtual articulator data generation device according to claim 1, wherein the relative position image is an image on which a first reference object attached to the upper-bow so that the positional relationship including angle relative to the upper-bow becomes a predetermined relationship, and a second reference object attached to the bite-fork so that the positional relationship including angle relative to the bite-fork becomes a predetermined relationship, are projected, wherein the position data generation means is configured to detect the positional relationship including angle between the upper-bow and the bite-fork, by performing image processing on the relative position images by using data about the predetermined positional relationship between the first reference object and the upper-bow, and the predetermined positional relationship between the second reference object and the bite-fork.

5. The virtual articulator data generation device according to claim 4, wherein the relative position images are at least two two-dimensional images in which the first reference object and the second reference object picked up from a plurality of directions are projected, wherein the relative position image data is data about at least two of the relative position images.

6. The virtual articulator data generation device according to claim 1, wherein the relative position image is at least one three-dimensional image in which the first reference object and the second reference object are projected, wherein the relative position image data is data about at least one of the relative position image.

7. A virtual articulator data generation method executed by a virtual articulator data generation device having a computer, capable of generating virtual articulator data which is data of a virtual articulator, by using images of a face-bow comprising an upper-bow fixedly securable to a cranium of a patient, keeping the relative positional relationship including angle in relation to a predetermined reference in the cranium of the patient uniquely determined, and a bite-fork fixedly securable to an lower face of a maxillary dental arch of the patient, by coating curable substance, which are precisely mounted to the patient, the virtual articulator data generation method comprising:

a reception process for receiving maxillary dental arch image data which is data of maxillary dental arch image defined as an image of a maxillary dental arch, mandibular dental arch image data which is data of a mandibular dental arch image defined as an image of a mandibular dental arch, upper-part image data which is data of an upper-part image defined as an image representative of the relative positional relationship including angle between the bite-fork and a lower face of the maxillary dental arch, relative position image data which is data of a relative position image defined as an image, on which the upper-bow and the bite-fork are collectively reflected, and representative of the relative positional relationship including angle between the upper-bow and the bite-fork, and occlusal image data which is data of occlusal images defined as images representative of an occlusal state of the maxillary dental arch and the mandibular dental arch; a model generation process for generating maxillary dental arch model data which is data of a maxillary dental arch model defined as a three-dimensional model of the maxillary dental arch, from the maxillary dental arch image data received from the reception means, as well as generating mandibular dental arch model data which is data of a mandibular dental arch model defined as a three-dimensional model of the mandibular dental arch, from the mandibular dental arch image data received from the reception means; a position data generation process for obtaining relative position including angle of the maxillary dental arch in relation to the reference surface in a living patient, from the upper-part image data and the relative position image data received from the reception means, generating first position data which is data about a position of the maxillary dental arch model relative to a virtual reference surface which is a phantom reference surface, as well as obtaining relative position including angle of the mandibular dental arch in relation to the maxillary dental arch, from occlusal image data received from the reception means, generating second position data which is data about a position of the mandibular dental arch model relative to the maxillary dental arch model; and a linking process for receiving the maxillary dental arch model data, and the mandibular dental arch model data from the model generation means, as well as receiving the first position data, and the second position data from the position data generation means, and generating the virtual articulator data, so that relative positional relationship of the maxillary dental arch and the mandibular dental arch to the reference surface in the living patient is reproduced in the positional relationship of the maxillary dental arch model and the mandibular dental arch model to the virtual reference surface by using the first position data and the second position data, which are executed by the computer.

8. A non-transitory computer-readable storage medium storing a computer program causing a computer to act as a virtual articulator data generation device capable of generating virtual articulator data, which is data of a virtual articulator, by using images of a face-bow comprising an upper-bow fixedly securable to a cranium of a patient keeping relative positional relationship including angle in relation to a predetermined reference surface in the cranium of the patient uniquely determined and a bite-fork fixedly securable to a lower face of a maxillary dental arch of the patient by coating curable substance, which are precisely mounted on the patient, the computer program causing the computer to act as:

a reception means for receiving maxillary dental arch image data which is data of a maxillary dental arch image defined as an image of a maxillary dental arch, mandibular dental arch image data which is data of a mandibular dental arch image defined as an image of a mandibular dental arch, upper-part image data which is data of an upper-part image defined as an image representative of the relative positional relationship including angle between the bite-fork and a lower face of the maxillary dental arch, relative position image data which is data of a relative position image defined as an image, on which the upper-bow and the bite-fork are collectively reflected, and representative of the relative positional relationship including angle between the upper-bow and the bite-fork, and occlusal image data which is data of occlusal images defined as images representative of an occlusal state of the maxillary dental arch and the mandibular dental arch; a model generation means for generating maxillary dental arch model data which is data of a maxillary dental arch model defined as a three-dimensional model of the maxillary dental arch from the maxillary dental arch image data received from the reception means, as well as generating mandibular dental arch model data which is data of a mandibular dental arch model defined as a three-dimensional model of the mandibular dental arch from the mandibular dental arch image data received from the reception means; a position data generation means for obtaining relative position including angle of the maxillary dental arch to the reference surface in a living patient, from the upper-part image data, and the relative position image data received from the reception means, generating first position data which is data about a position of the maxillary dental arch model relative to a virtual reference surface which is a phantom reference surface, as well as obtaining relative position including angle of the mandibular dental arch in relation to the maxillary dental arch, from occlusal image data received from the reception means, generating second position data which is data about a position of the mandibular dental arch model relative to the maxillary dental arch model; and a linking means for receiving the maxillary dental arch model data, and the mandibular dental arch model data from the model generation means, as well as receiving the first position data and the second position data, from the position data generation means, and generating the virtual articulator data, so that the relative positional relationship of the maxillary dental arch and the mandibular dental arch to the reference surface in the living organism is reproduced in the positional relationship of the maxillary dental arch model and the mandibular dental arch model to the virtual reference surface, by using the first position data and the second position data.

* * * * *